(12) United States Patent
Nakao

(10) Patent No.: US 7,203,481 B2
(45) Date of Patent: Apr. 10, 2007

(54) RADIO COMMUNICATION SYSTEM WITH HIGH SECURITY LEVEL, AND COMMUNICATION UNIT AND PORTABLE TERMINAL USED THEREFOR

(75) Inventor: Atsushi Nakao, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 196 days.

(21) Appl. No.: 10/359,727

(22) Filed: Feb. 7, 2003

(65) Prior Publication Data

US 2003/0153300 A1 Aug. 14, 2003

(30) Foreign Application Priority Data

Feb. 7, 2002 (JP) ............................. 2002-030805

(51) Int. Cl.
*H04M 1/66* (2006.01)
(52) U.S. Cl. .................................... 455/411; 455/435.1
(58) Field of Classification Search ................ 455/411, 455/410, 466, 461; 380/249
See application file for complete search history.

(56) References Cited

U.S. PATENT DOCUMENTS

| | | | |
|---|---|---|---|
| 5,282,250 A | | 1/1994 | Dent et al. |
| 5,297,189 A | * | 3/1994 | Chabernaud ................. 455/461 |
| 5,655,004 A | | 8/1997 | Holbrook |
| 5,812,667 A | * | 9/1998 | Miki et al. ................... 380/249 |
| 6,766,160 B1 | * | 7/2004 | Lemilainen et al. ......... 455/411 |
| 2002/0132605 A1 | * | 9/2002 | Smeets et al. ............... 455/411 |

FOREIGN PATENT DOCUMENTS

| | | |
|---|---|---|
| EP | 1 146 692 A2 | 10/2001 |
| EP | 1 168 870 A1 | 1/2002 |
| JP | 4-165859 A | 6/1992 |
| JP | 5-14271 A | 1/1993 |
| JP | 5-308673 A | 11/1993 |
| JP | 6069882 | 3/1994 |
| JP | 7-298340 A | 11/1995 |
| JP | 10-336345 A | 12/1998 |
| JP | 11-298631 A | 10/1999 |
| JP | 2000-83284 A | 3/2000 |
| JP | 2000-188644 A | 7/2000 |
| JP | 2001-245361 A | 9/2001 |
| JP | 2001-312471 A | 11/2001 |
| JP | 2001-350718 A | 12/2001 |

(Continued)

*Primary Examiner*—Temica Beamer
*Assistant Examiner*—Joy Contee
(74) *Attorney, Agent, or Firm*—Birch, Stewart, Kolasch & Birch, LLP

(57) ABSTRACT

A communication system constituted with a portable phone, a hot spot computer, and a server unit establishing radio communication is provided. The portable phone includes a circuit receiving identification information from the hot spot computer, which is a party on the other end in radio communication; a circuit transmitting the received identification information to the server unit; a circuit receiving authentication information of a computer corresponding the identification information transmitted to the server unit; and a circuit transmitting connection request information along with the authentication information received from the server unit to the hot spot computer. The hot spot computer includes a circuit permitting communication with the portable phone based on whether or not the authentication information obtained by the portable phone matches the authentication information stored in advance in the hot spot computer, in response to receiving of the connection request information.

23 Claims, 35 Drawing Sheets

FOREIGN PATENT DOCUMENTS

| | | |
|---|---|---|
| JP | 2002-7345 A | 1/2002 |
| JP | 2002-7355 A | 1/2002 |
| JP | 2003-208405 A | 7/2003 |
| JP | 2003-208408 A | 7/2003 |
| WO | WO-97/09835 A1 | 3/1997 |
| WO | WO-98/02008 A3 | 1/1998 |

* cited by examiner

| HOT SPOT ID | PASSWORD |
|---|---|
| ADDR_A(1) | AUTH_A(1) |
| ADDR_A(2) | AUTH_A(2) |
| ... | ... |
| ADDR_A(n) | AUTH_A(n) |

| REGISTRATION ID | TELEPHONE NUMBER OF PORTABLE PHONE |
|---|---|
| 1 | ADDR_T(1) |
| 2 | ADDR_T(3) |
| 3 | ADDR_T(5) |
| ... | ... |

FIG. 36

| REGISTRATION ID | TELEPHONE NUMBER OF PORTABLE PHONE | CHARGE INFORMATION | STATISTIC INFORMATION |
|---|---|---|---|
| 1 | ADDR_T(1) | ... | ... |
| 2 | ADDR_T(3) | ... | ... |
| 3 | ADDR_T(5) | ... | ... |
| ... | ... | ... | ... |

FIG. 37

| HOT SPOT ID | PASSWORD | CHARGE INFORMATION | STATISTIC INFORMATION |
|---|---|---|---|
| ADDR_A(1) | AUTH_A(1) | ... | ... |
| ADDR_A(2) | AUTH_A(2) | ... | ... |
| ... | ... | ... | ... |
| ADDR_A(n) | AUTH_A(n) | ... | ... |

FIG. 38

PORTABLE PHONE → SERVER UNIT

| CHARGE INFORMATION NOTIFICATION COMMAND | HOT SPOT ID | TELEPHONE NUMBER OF PORTABLE PHONE | COMMUNICATION DURATION | AMOUNT OF COMMUNICATED DATA |
|---|---|---|---|---|

FIG. 39

PORTABLE PHONE → SERVER UNIT

| CHARGE INFORMATION REQUEST COMMAND | TELEPHONE NUMBER OF PORTABLE PHONE |
|---|---|

FIG. 40

SERVER UNIT → PORTABLE PHONE

| TOTAL CHARGE INFORMATION NOTIFICATION COMMAND | TOTALED COMMUNICATION CHARGE | TOTALED COMMUNICATION DURATION | TOTALED AMOUNT OF COMMUNICATED DATA |
|---|---|---|---|

F I G. 4 8
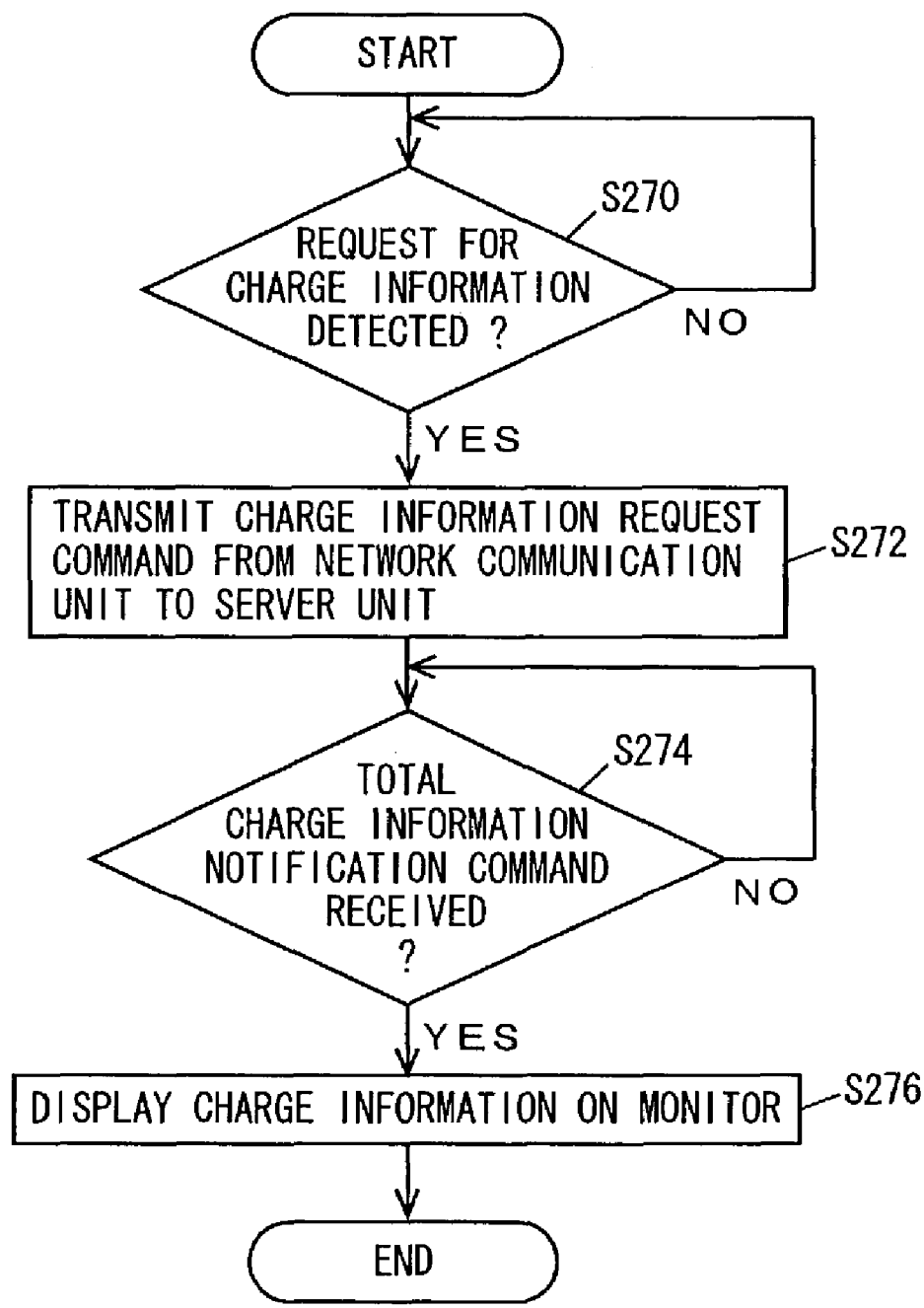

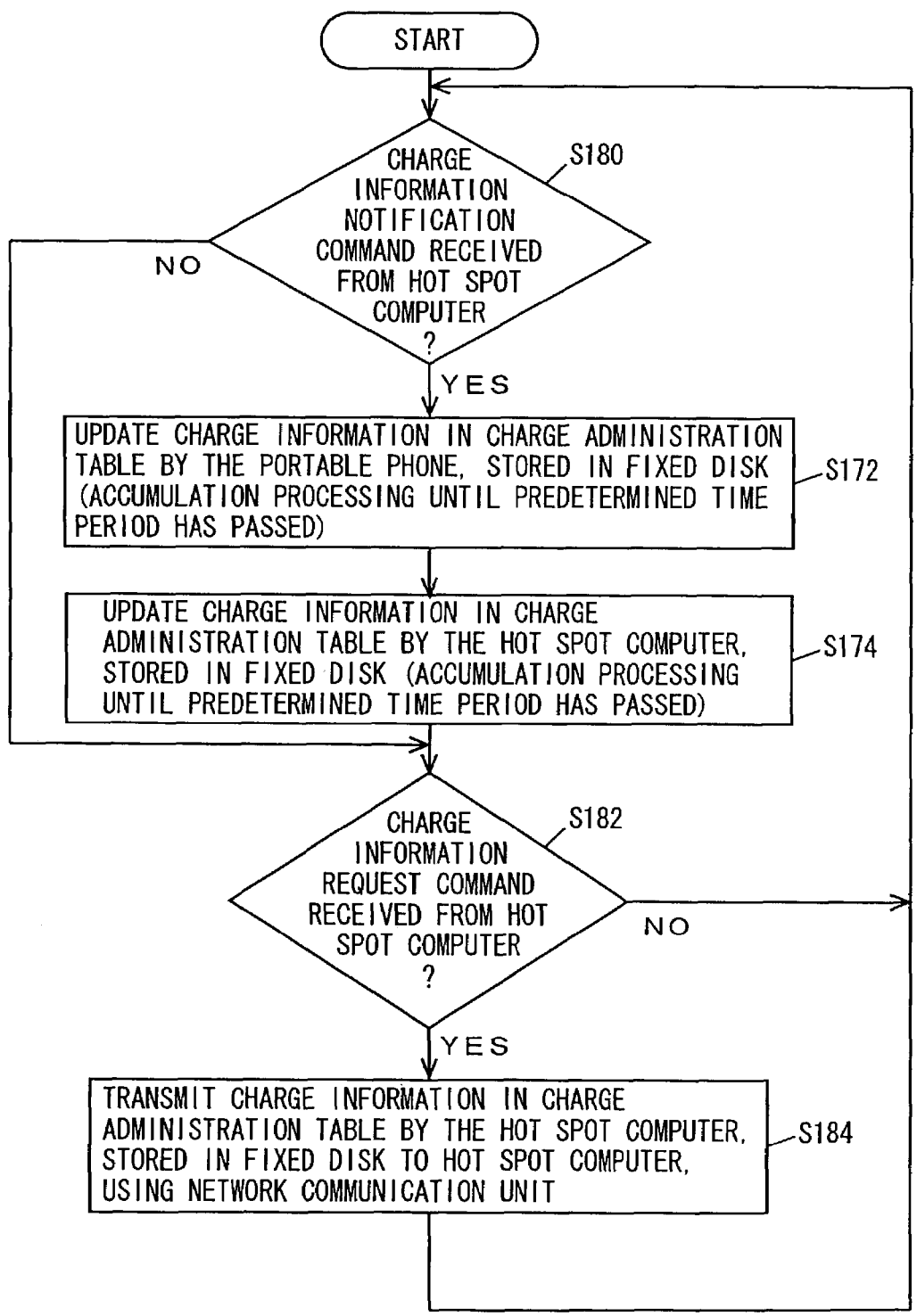

RADIO COMMUNICATION SYSTEM WITH HIGH SECURITY LEVEL, AND COMMUNICATION UNIT AND PORTABLE TERMINAL USED THEREFOR

This nonprovisional application claims priority under 35 U. S. C. §119(a) on Patent Application No. 2002-030805 filed in JAPAN on Feb. 7, 2002, which is herein incorporated by reference.

BACKGROUND OF THE INVENTION

1. Field of the Invention

The present invention relates to a system including a communication unit, a portable terminal communicating data with the communication unit, and an authentication unit ensuring security of communication between the communication unit and the portable terminal. More particularly, the present invention relates to a technique with which data communication can be implemented with ensured security even if a communication unit does not hold in advance information of a portable terminal when radio communication is established between the communication unit and the portable terminal.

2. Description of the Background Art

With the development of networks such as the Internet in recent days, data is communicated among a variety of devices. The data communicated in such a manner includes personal information which should not be leaked to a third party from the viewpoint of privacy protection. In order to avoid leakage of such personal information, it is necessary to establish data communication with a specified party.

Japanese Patent Laying-Open No. 10-336345 discloses a method of authenticating a caller with a high security level. The method of authentication disclosed therein authenticates a caller of a portable phone requesting access via an access point to an information provider unit connected to a network. This method for authenticating the caller includes the following steps: a portable phone requests line connection to an information provider unit via a controller at the access point; the portable phone transmits a telephone number thereof to the information provider unit via the controller after the line is connected; the information provider unit authenticates whether or not the received telephone number is the number of the contracted user registered in advance; the information provider unit transmits an authentication result to the controller; and the controller forms a logic path between the portable phone and the information provider unit based on the authentication.

According to the authentication method, authentication of the caller requesting a communication access to the network is carried out based on the telephone number of the portable phone. Therefore, compared to the authentication method based on a user ID and a password, security level of authentication of the caller is significantly improved, because the telephone number notified through "caller ID display" of the portable phone can be used for authentication.

In the authentication method disclosed in the publication, however, the telephone number of the contracted user should be registered in advance in the information provider unit. In addition, the controller at the access point has to be able to communicate with the information provider unit. In other words, in an attempt to implement the authentication method disclosed in the publication described above, it is necessary that the controller at the access point is connected to the information provider unit authenticating if the caller is the contracted user, and that a telephone number of a portable phone or PDA (Personal Digital Assistant) is registered in advance as authentication information in the information provider unit. Recently, a portable phone or a PDA mounted with a short-range radio communication device such as Bluetooth is used to receive a variety of information from controllers installed at access points in a city. In such a case, it is difficult to register in advance information for authenticating a portable phone or a PDA in all controllers.

SUMMARY OF THE INVENTION

An object of the present invention is to provide a radio communication system capable of implementing authentication of a high security level between a portable terminal and a radio unit between which radio communication is established.

Another object of the present invention is to provide a radio communication system capable of implementing authentication of a high security level between a portable terminal and a radio unit between which radio communication is established, even if the radio unit does not have information about the portable terminal that has requested connection.

Yet another object of the present invention is to provide a radio communication system capable of implementing authentication of a high security level, using identification information of a portable terminal, between the portable terminal and a radio unit between which radio communication is established.

Yet another object of the present invention is to provide a radio communication system in which charge information with regard to communication is readily created between a portable terminal and a radio unit between which radio communication is established.

A radio communication authentication system according to the present invention includes a plurality of first communication units, a second communication unit, and a portable terminal establishing radio communication with each of the first communication units. The first communication unit includes storage means for storing identification information for identifying the unit itself and authentication information corresponding to the identification information, and transmission means connected to the storage means, for transmitting the identification information to the portable terminal. The portable terminal includes first reception means for receiving the identification information from the first communication unit, and first transmission means for transmitting the identification information to the second communication unit. The second communication unit includes reception means for receiving the identification information from the portable terminal; first registration means for registering the identification information and the authentication information corresponding to each of the first communication units; search means connected to the reception means and the first registration means, for searching the registered authentication information based on the identification information received from the portable terminal; and transmission means connected to the search means, for transmitting searched authentication information to the portable terminal. The portable terminal further includes second reception means for receiving the searched authentication information from the second communication unit, and second transmission means for transmitting information requesting connection of the portable terminal to the first communication unit to the first communication unit. The first communication unit further includes reception means for receiving searched authentication information and information requesting connection from the portable unit, and determination means connected to the reception means and the storage means, for determining whether or not connection of the portable terminal to the first communication unit is permitted based on the stored authentication information.

The portable phone transmits an identification number of the first communication unit received from the first communication unit to the second communication unit. In the first registration means of the second communication unit, the identification information and the authentication information are registered corresponding to each of the first communication units. The search means of the second communication unit searches authentication information registered corresponding to the identification information matching with the identification information received from the portable phone. The second communication unit transmits the searched authentication information to the portable terminal. The portable terminal transmits information requesting connection to the first unit based on the authentication information received from the second communication unit. The first communication unit performs an authentication processing using the authentication information stored in the storage means when connection is requested from the portable terminal, and when authentication is successful, it determines that communication with the portable terminal is permitted. Thus, in establishing radio communication between the first communication unit and the portable terminal, a radio communication authentication system capable of implementing authentication of a high security level can be provided even if the first communication unit does not have information about the portable terminal that has requested connection.

More preferably, the portable terminal further includes storage means for storing identification data for identifying the terminal itself. The first transmission means includes means for transmitting the identification information to the second communication unit along with the identification data. The second communication unit further includes second registration means for registering identification data of the portable terminal satisfying a predetermined condition. Transmission means of the second communication unit includes means for transmitting searched authentication information to the portable terminal when identification data received from the portable terminal has been registered in the second registration means.

The portable terminal transmits the identification data of the terminal itself (for example, the identification data is a telephone number, if the portable terminal is a portable phone) to the second communication unit. In the second registration means of the second communication unit, a telephone number of a portable phone satisfying a predetermined condition (for example, a telephone number for which application has been made in advance) is registered. The second communication unit transmits the searched authentication information to the portable phone when the telephone number received from the portable phone has been registered in the second registration means. Thus, only the portable phone from which application has been made in advance is permitted connection to the first communication unit.

More preferably, the portable terminal in the present communication system is a portable phone, and the identification data is a telephone number of the portable phone.

By using the portable phone, a radio communication authentication system capable of implementing authentication of a high security level can be provided even if the first communication unit does not have information about the portable phone that has requested connection.

More preferably, the communication unit further includes communication means for communicating with the second communication unit. The second communication unit further includes communication means for communicating with the first communication unit. The storage means includes means for storing identification information for identifying the unit itself and authentication information corresponding to the identification information based on information transmitted from the second communication unit to the first communication unit using the communication means, when a predetermined condition is satisfied.

When the predetermined condition is satisfied (for example, when a time to create information registered in the first registration means has come), authentication information is transmitted from the second communication unit to the first communication unit. The first communication unit stores the authentication information transmitted from the second communication unit in the storage means. Thus, the second communication unit can create authentication information at a predetermined interval, and the security level is further improved.

More preferably, the first communication unit further includes communication means for communicating with the second communication unit. The second communication unit further includes communication means for communicating with the first communication unit. The first registration means includes means for registering identification information and authentication information corresponding to each of the first communication units based on information transmitted from the first communication unit to the second communication unit using the communication means, when a predetermined condition is satisfied.

When the predetermined condition is satisfied (for example, when a time to update the authentication information stored in the storage means has come), the authentication information is transmitted from the first communication unit to the second communication unit. The second communication unit registers the authentication information transmitted from the first communication unit in the first registration means. Thus, the first communication unit can update the authentication information at a predetermined interval, and the security level is further improved.

More preferably, the first communication unit further includes communication means for communicating with the second communication unit. The second communication unit further includes communication means for communicating with the first communication unit. The portable terminal further includes storage means for storing identification data for identifying the terminal itself, and authentication data. The first transmission means includes means for transmitting the identification information to the second communication unit along with the identification data and authentication data. The second communication unit further includes determination means for determining whether or not the authentication data is valid, and control means for controlling transmission means and communication means of the second communication unit so as to transmit any one of the identification data, the authentication data and the authentication information to the portable terminal and the first communication unit based on determination by the determination means.

The portable terminal transmits the identification data identifying the terminal itself (for example, the telephone number of the portable phone) and the authentication data (a password set on the portable phone side) to the second communication unit. The determination means of the second communication unit transmits to the portable terminal and the first communication unit, that authentication data when the authentication data transmitted from the portable terminal is determined as valid, and transmits the authentication information when it is determined as invalid. Thus, authentication with higher security can be carried out.

More preferably, the portable terminal further includes creation means for creating charge information with respect to communication between the portable terminal and the first communication unit, and control means connected to the creation means, for controlling the first transmission means so as to transmit the charge information to the second communication unit. The second communication unit further includes storage means for storing charge information received from the portable terminal, and control means for controlling the transmission means so as to transmit charge information stored in the storage means to the portable terminal in response to request information from the portable terminal. The portable terminal further includes output means for outputting charge information transmitted from the second communication unit in response to the request information.

The portable terminal creates charge information with regard to communication between the terminal itself and the first communication unit. The created charge information is transmitted to the second communication unit, and accumulated for a predetermined period (for example, one month) for each portable terminal. When the portable phone requests viewing of the charge information, the accumulated charge information stored in the storage means in the second communication unit is transmitted and output to the portable terminal.

More preferably, the first communication unit further includes creation means for creating charge information with respect to communication between the portable terminal and the first communication unit, and control means connected to the creation means, for controlling communication means of the first communication unit so as to transmit the charge information to the second communication unit. The second communication unit further includes storage means for storing charge information received from the first communication unit, and control means for controlling communication means of the second communication unit so as to transmit charge information stored in the storage means to the first communication unit in response to request information from the first communication unit. The first communication unit further includes output means for outputting charge information transmitted from the second communication unit in response to the request information.

The first communication unit creates charge information with regard to communication between the unit itself and the portable terminal. The created charge information is transmitted to the second communication unit, and accumulated for a predetermined period (for example, one month) for each first communication unit. When the first communication unit requests viewing of the charge information, the accumulated charge information stored in the storage means in the second communication unit is transmitted and output to the first communication unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 36 shows a database of charge information by a portable phone, stored in a fixed disk of a server unit according to Embodiment 6 of the present invention.

FIG. 37 shows a database of charge information by a hot spot computer, stored in the fixed disk of the server unit according to Embodiment 6 of the present invention.

FIG. 38 shows a charge information notification command transmitted from a portable phone to the server unit according to Embodiment 6 of the present invention.

FIG. 39 shows a charge information request command transmitted from the portable phone to the server unit according to Embodiment 6 of the present invention.

FIG. 40 shows a total charge information notification command transmitted from the server unit to the portable phone according to Embodiment 6 of the present invention.

FIGS. 47A, 47B and 48 are flowcharts of a processing performed in the hot spot computer in a radio communication system according to Embodiment 7 of the present invention.

FIG. 49 is a flowchart of a processing performed in the server unit in the radio communication system according to Embodiment 7 of the present invention.

DESCRIPTION OF THE PREFERRED EMBODIMENTS

Figure 1:
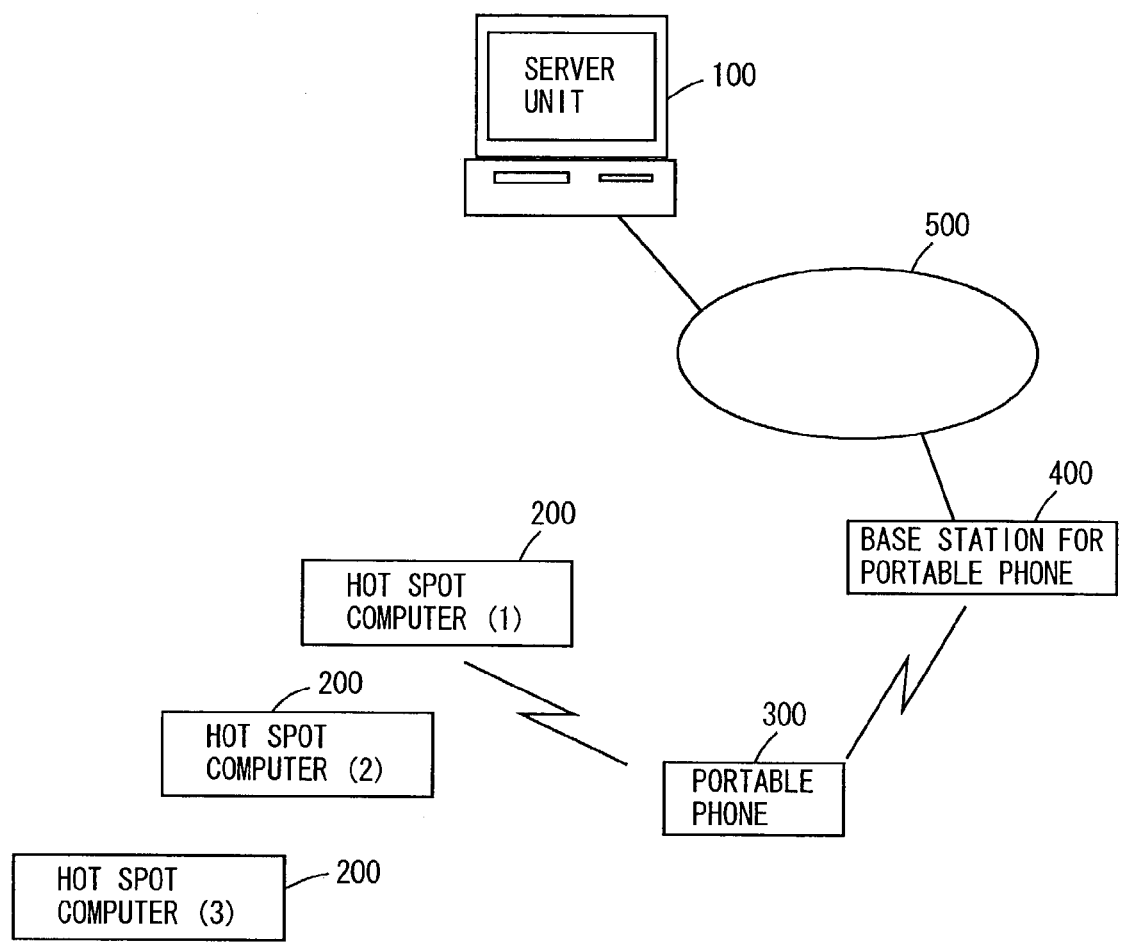
FIG. 1 shows a configuration of a radio communication system according to Embodiment 1 of the present invention.

In the following, embodiments of the present invention will be described in detail with reference to the figures. It is noted that the same reference characters refer to the same or corresponding components in the figures, and names and functions thereof are also the same. Therefore, detailed description therefor will not be repeated.

Embodiment 1

Referring to FIG. 1, an overall configuration of a radio communication system according to the present embodiment will be described. In the following description, a portable phone is given as an example of a portable terminal; a hot spot computer installed at a hot spot in a city is given as an example of a first communication unit; and a server unit connected to the portable phone through a portable phone network is given as an example of a second communication unit. As shown in FIG. 1, the system includes a hot spot computer 200 installed in a city, a portable phone 300 establishing short-range radio communication with hot spot computer 200, and a server unit 100 connected to portable phone 300 through the portable phone network. Data communication is implemented between hot spot 200 and portable phone 300 with short-range radio communication called "Bluetooth". Data communication is implemented between server unit 100 and portable phone 300 via a portable phone base station 400 and a portable phone network 500. Here, server unit 100 may be connected to portable phone 300 with a wire. The first communication means implemented by the first communication unit may be the same as the second communication means implemented by the second communication unit.

Figure 2:
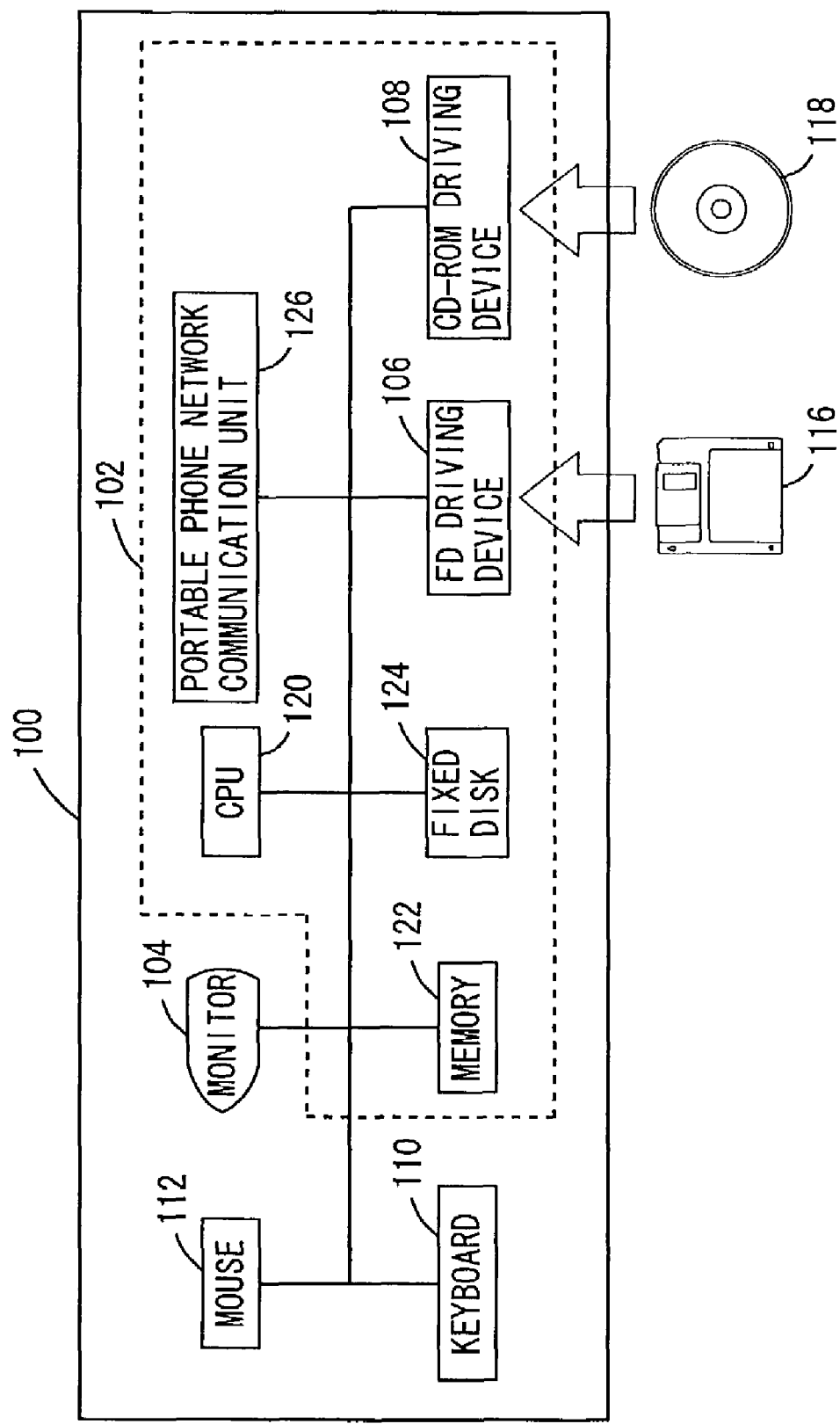
FIG. 2 is a control block diagram of a server unit of the radio communication system shown in FIG. 1.

FIG. 2 shows a control block of a computer system, which is an example of server unit 100. Referring to FIG. 2, the computer system includes a computer 102 having an FD (Flexible Disk) driving unit 106 and a CD-ROM (Compact Disc-Read Only Memory) driving unit 108, a monitor 104, a keyboard 110, and a mouse 112. Moreover, in addition to the aforementioned FD driving unit 106 and CD-ROM driving unit 108, computer 102 includes a CPU (Central Processing Unit) 120, a memory 122, a fixed disk 124, and a portable phone network communication unit 126, connected to one another with a bus. An FD 116 is attached to FD driving unit 106. A CD-ROM 118 is attached to CD-ROM driving unit 108.

A processing in server unit 100 is performed by computer hardware and software executed by CPU 120. Generally, such software is stored in a storage medium such as FD 116 or CD-ROM 118 for distribution, read from the storage medium by FD driving unit 106 or CD-ROM driving unit 108, and once stored in fixed disk 124. In addition, the software is read from fixed disk 124 to memory 122 to be executed by CPU 120. Computer hardware itself shown in FIG. 2 is common. Therefore, the most essential part of the present invention is the software stored in the storage medium such as FD 116, CD-ROM 118, or fixed disk 124.

An operation of the computer itself shown in FIG. 2 is well-known, and detailed description therefor will not be repeated.

Figure 3:
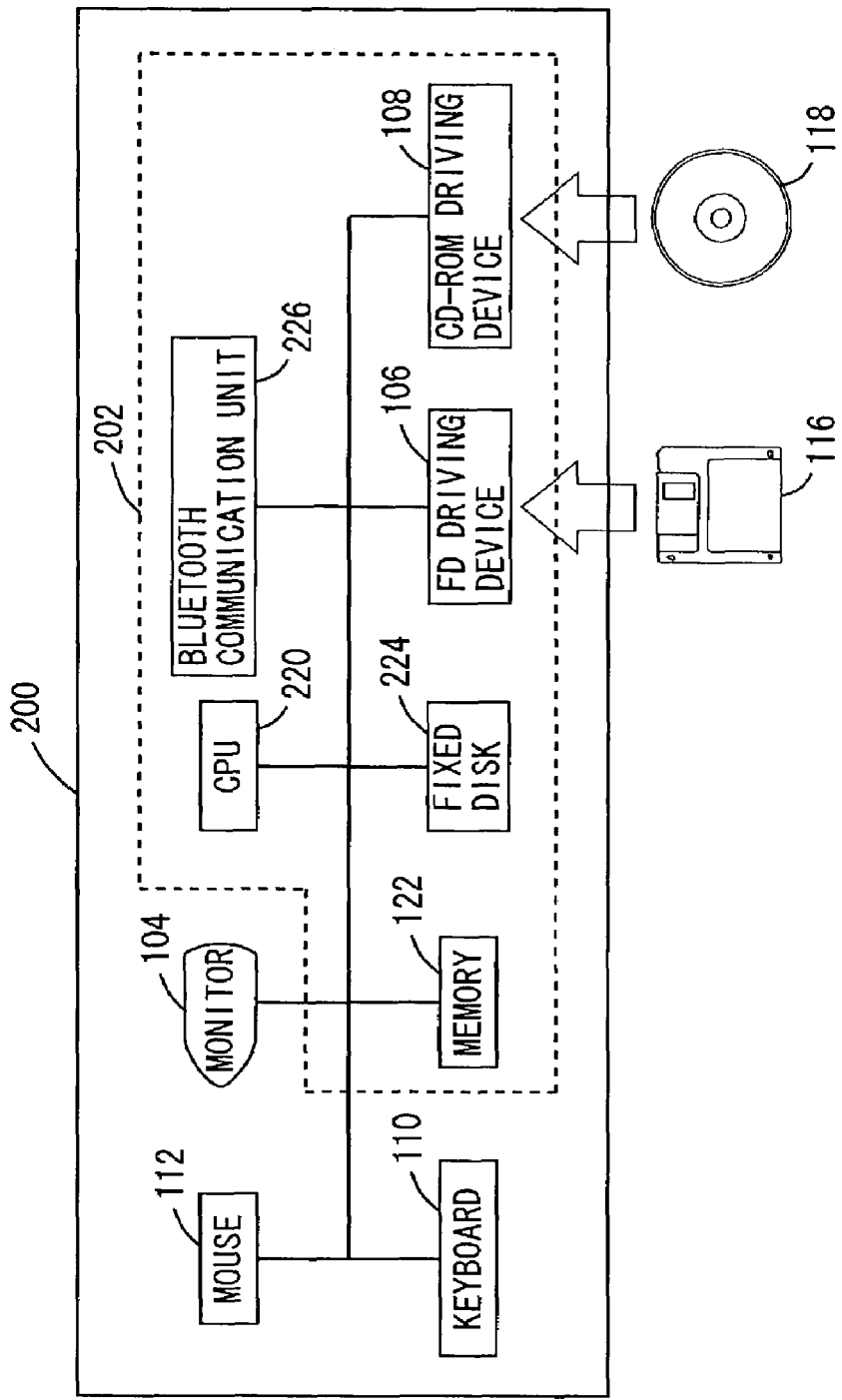
FIG. 3 is a control block diagram of a hot spot computer of the radio communication system shown in FIG. 1.

FIG. 3 shows a control block of a computer system, which is an example of hot spot computer 200. Referring to FIG. 3, the computer system includes a CPU 220 executing a program different from that in server unit 100 described with reference to FIG. 2, a fixed disk 224 storing different information, and a Bluetooth communication unit 226 establishing short-range radio communication with portable phone 300.

A processing in hot spot computer 200 is also implemented by computer hardware and software executed by CPU 220, as in server unit 100. Computer hardware itself shown in FIG. 3 is common, and the most essential part of the present invention is the software stored in the storage medium such as FD 116, CD-ROM 118, or fixed disk 224.

An operation of the computer itself shown in FIG. 3 is also well-known, and detailed description therefor will not be repeated.

Figures 4, 5:
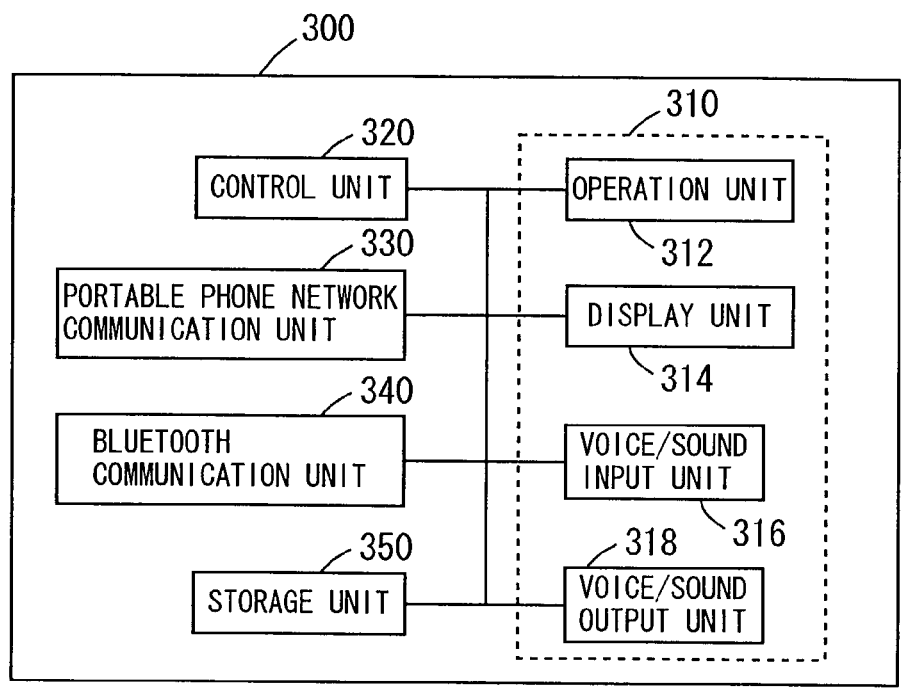
FIG. 4 is a control block diagram of a portable phone of the radio communication system shown in FIG. 1.
FIG. 5 shows an administration table stored in a fixed disk of the server unit according to Embodiment 1 of the present invention.

Referring to FIG. 4, a control block of portable phone 300 according to the present invention will be described. As shown in FIG. 4, portable phone 300 includes an input/output unit 110 which is an interface with a user, a control unit 320 providing overall control of portable phone 300, a portable phone network communication unit 330 for communicating with server unit 100, a Bluetooth communication unit 340 for communicating with hot spot computer 200, and a storage unit 350 storing a program executed in control unit 102, intermediate data of the program and data received from other device. Input/output unit 310 includes an operation unit 312 with which a user of the portable phone inputs a telephone number of other telephone, inputs an item for retrieving a received e-mail, or inputs a display request of the received e-mail, using a ten-key, for example; a display unit 314 consisting of an LCD (Liquid Crystal Display) displaying information to the user; a voice/sound input unit 316 consisting of a microphone from which voice/sound is input; and a voice/sound output unit 318 consisting of a speaker outputting voice/sound.

A processing in portable phone 300, in which the user causes authentication for communication with hot spot computer 200 to be carried out in server unit 100, is also implemented by hardware of portable phone 300 and software executed by control unit 320. Hardware itself of portable phone 300 shown in FIG. 4 is common, and the most essential part of the present invention is the software stored, for example, in storage unit 350.

An operation of the portable phone itself shown in FIG. 4 is also well-known, and detailed description therefor will not be repeated.

Referring to FIG. 5, an administration table stored in fixed disk 124 in server unit 100 according to the present embodiment will be described. As shown in FIG. 5, the administration table stores a password, which is authentication information, for each hot spot ID (Idenfication). For example, when a hot spot ID is represented as "ADDR_A (1)", a password as the authentication information will be represented as "AUTH_A(1)". N pieces of information combining such a hot spot ID and a password as a set are stored. Here, n is the number of the hot spot computers.

Figure 6:
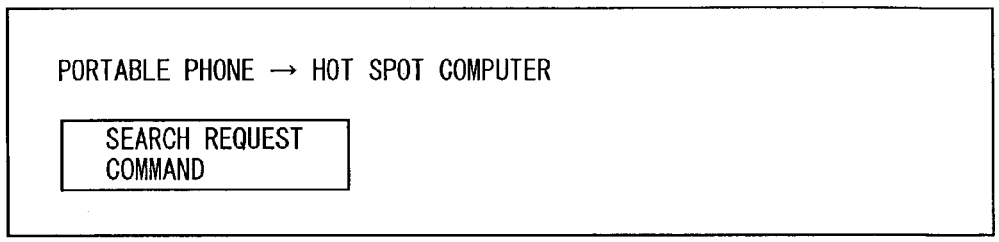
FIG. 6 shows a search request command transmitted from the portable phone to the hot spot computer according to Embodiment 1 of the present invention.
Figure 7:
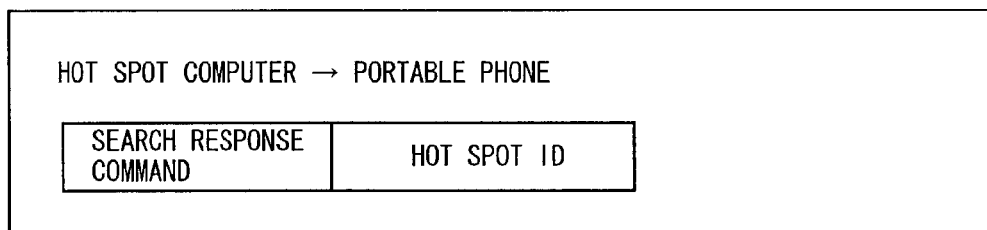
FIG. 7 shows a search response command transmitted from the hot spot computer to the portable phone according to Embodiment 1 of the present invention.
Figure 8:
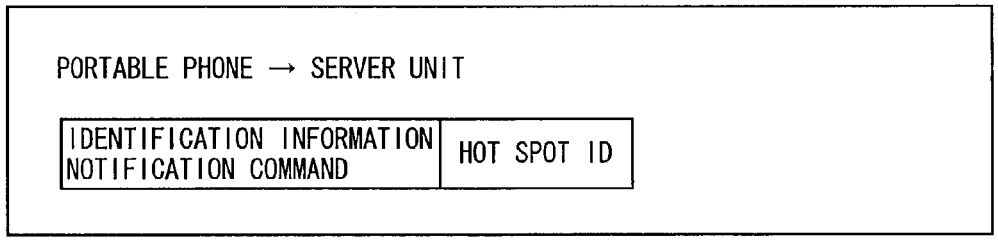
FIG. 8 shows an identification information notification command transmitted from the portable phone to the server unit according to Embodiment 1 of the present invention.
Figure 9:
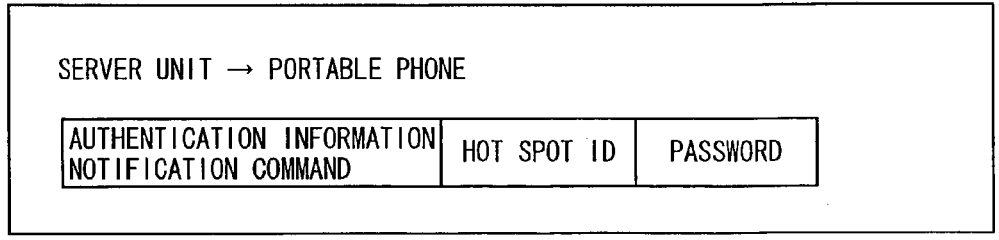
FIG. 9 shows an authentication information notification command transmitted from the server unit to the portable phone according to Embodiment 1 of the present invention.

According to the present embodiment, FIG. 6 shows a search request command transmitted from portable phone 300 to hot spot computer 200; FIG. 7 shows a search response command transmitted from hot spot computer 200 to portable phone 300; FIG. 8 shows an identification information notification command transmitted from portable phone 300 to server unit 100; and FIG. 9 shows an authentication information notification command transmitted from server unit 100 to portable phone 300. The search request command shown in FIG. 6 is broadcast from portable phone 300 to hot spot computer 200. Here, portable phone 300 does not have information for individually identifying hot spot computer 200. As shown in FIGS. 7 and 8, the search response command and the identification information notification command include a hot spot ID respectively. As shown in FIG. 9, the authentication information notification command includes the hot spot ID and a password. The hot spot ID and the password are stored in the administration table shown in aforementioned FIG. 5. Here, the hot spot ID may be a unique physical address or positional information of the Bluetooth communication unit in the hot spot computer.

Figure 10:
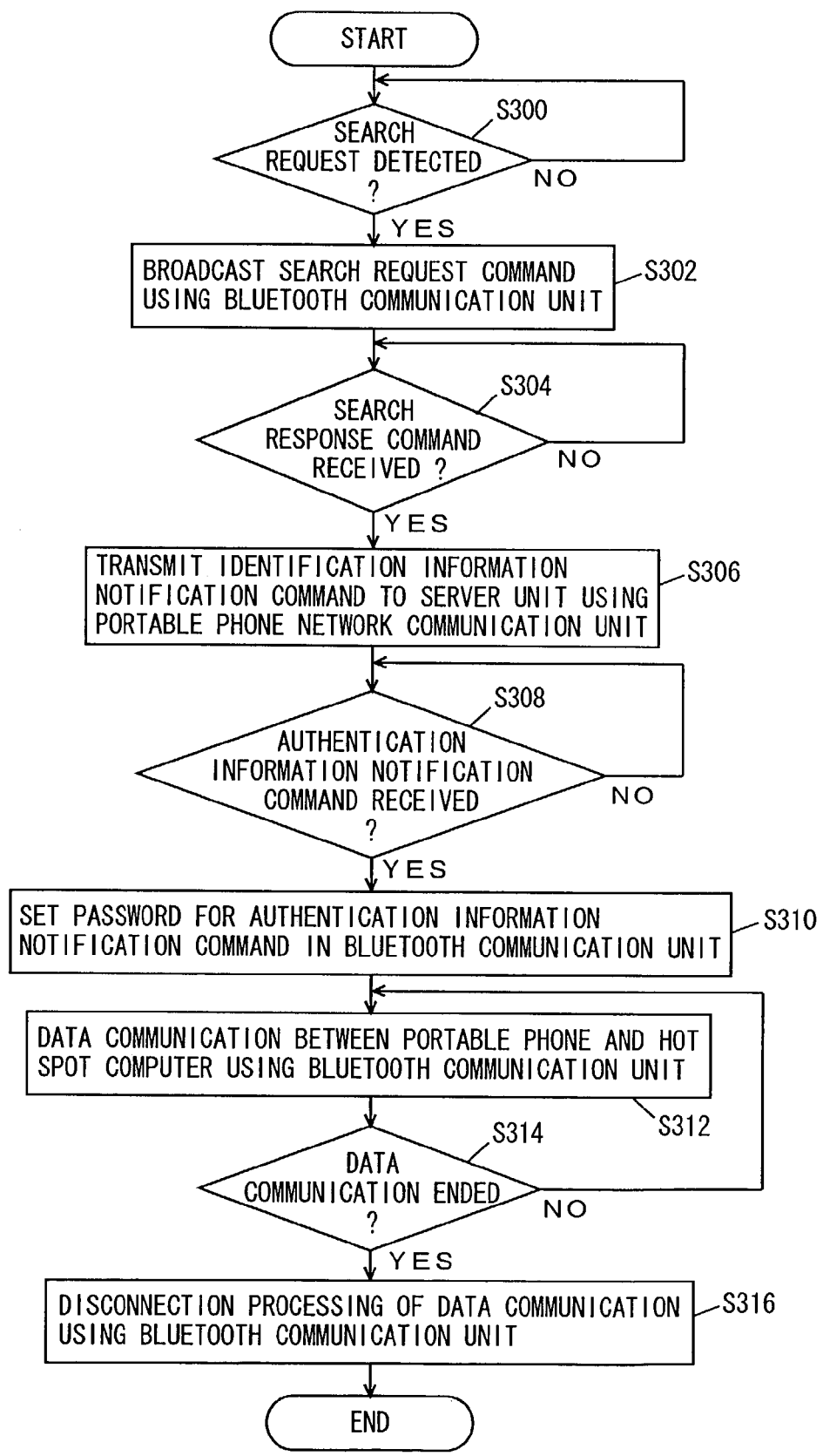
FIG. 10 is a flowchart of a processing performed in the portable phone in the radio communication system according to Embodiment 1 of the present invention.

Referring to FIG. 10, a program executed in portable phone 300 according to the present embodiment has the following control configuration.

At step (hereinafter, a "step" is abbreviated as "S") 300, control unit 320 of portable phone 300 determines whether or not a search request is detected based on information input from operation unit 312 of portable phone 300. When the search request is detected (YES at S300), the processing will proceed to S302. Otherwise (NO at S300), the processing will return to S300, and waits until the user of portable phone 300 inputs the search request.

At S302, control unit 320 uses Bluetooth communication unit 340 to broadcast the search request command (FIG. 6). At S304, control unit 320 determines whether or not the search response command (FIG. 7) is received. The search response command receives via Bluetooth communication unit 340 from hot spot computer 200. When the search response command is received (YES at S304), the processing will proceed to S306. Otherwise (NO at S304), the processing will return to S300, and waits until the search response command is received from hot spot computer 200.

At S306, control unit 320 uses portable phone network communication unit 330 to transmit the identification information notification command (FIG. 8) to server unit 100. At S308, control unit 320 determines whether or not the authentication information notification command (FIG. 9) is received from server unit 100. When the authentication information notification command is received from server unit 100 (YES at S308), the processing will proceed to S310. Otherwise (NO at S308), the processing will return to S308, and waits until the authentication information notification command is received from server unit 100.

At S310, control unit 320 sets a password of the authentication information notification command (FIG. 9) in Bluetooth communication unit 340. At S312, control unit 320 uses Bluetooth communication unit 340 to communicate data between portable phone 300 and hot spot computer 200.

At S314, control unit 320 determines whether or not the data communication ends. The determination is carried out based on the information input from operation unit 312 of portable phone 300, for example. When the data communication is terminated (YES at S314), the processing will proceed to S316. Otherwise (NO at S314), the processing will return to S312, and data communication between portable phone 300 and hot spot computer 200 is continued, using Bluetooth communication unit 340.

At S316, control unit 320 performs disconnection processing for data communication using Bluetooth communication unit 340.

Figure 11:
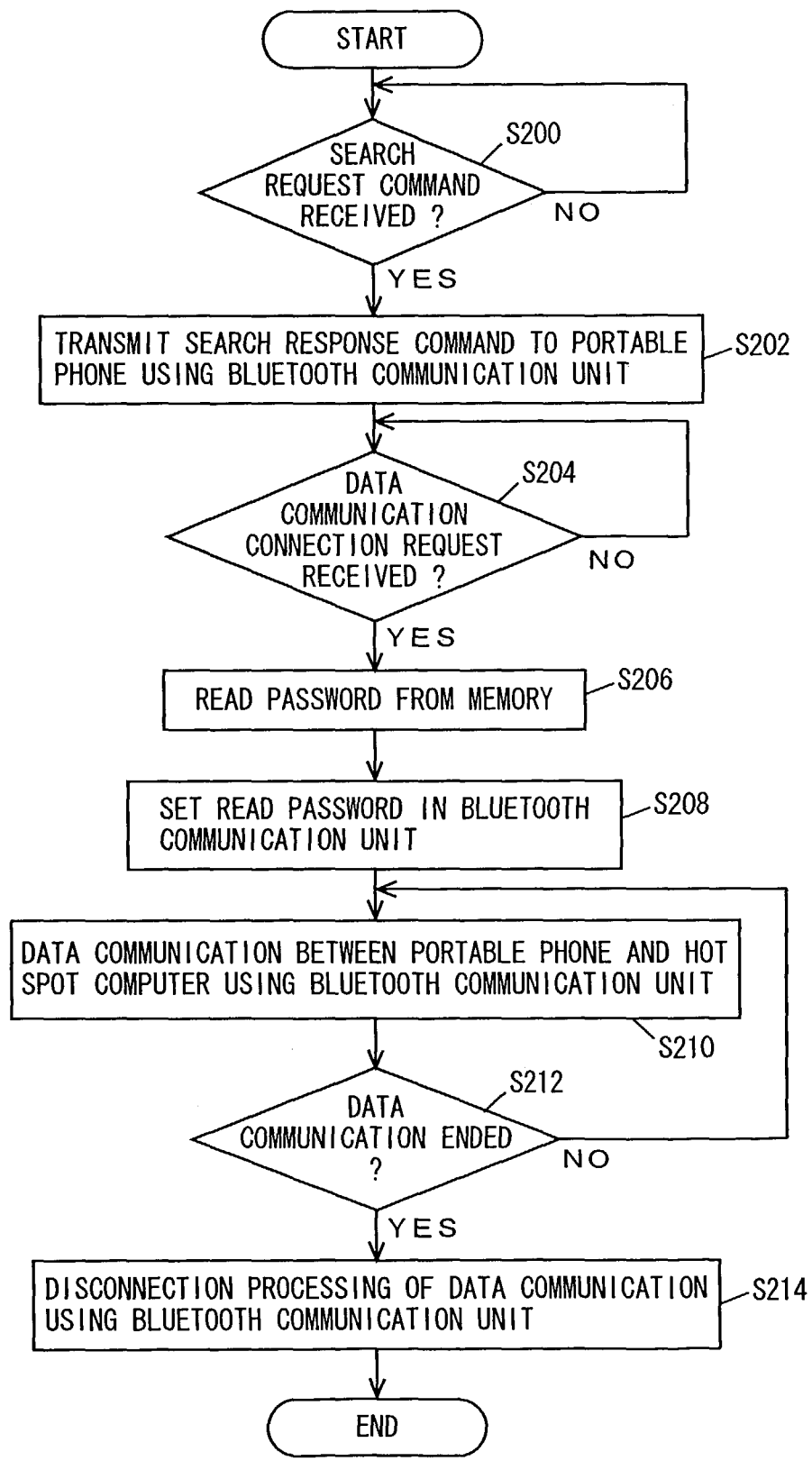
FIG. 11 is a flowchart of a processing performed in the hot spot computer in the radio communication system according to Embodiment 1 of the present invention.

Referring to FIG. 11, a program executed in hot spot computer 200 according to the present embodiment has the following control configuration.

At S200, CPU 220 of hot spot computer 200 determines whether or not the search request command is received. The search request command is received from portable phone 300 via Bluetooth communication unit 226. When the search request command is received (YES at S200), the processing will proceed to S202. Otherwise (NO at S200), the processing will return to S200, and waits until the search request command is received from portable phone 300.

At S202, CPU 220 uses Bluetooth communication unit 226 to transmit the search response command (FIG. 7) to portable phone 300. At S204, CPU 220 determines whether or not a data communication connection request is received. The determination is carried out based on the information received from portable phone 300 via Bluetooth communication unit 226. When the data communication connection request is received (YES at S204), the processing will proceed to S206. Otherwise (NO at S204), the processing will return to S200, and waits until the data communication connection request is received from portable phone 300.

At S206, CPU 220 reads the password from memory 122. In memory 122 of hot spot computer 200, the hot spot ID and the password corresponding to respective hot spot computer 200 are stored. At S208, CPU 220 sets the password read from memory 122 in Bluetooth communication unit 226.

At S210, CPU 220 uses Bluetooth communication unit 226 to communicate data between portable phone 300 and hot spot computer 200. At S212, CPU 220 determines whether or not the data communication ends. The determination is performed based on the information input from keyboard 110 or mouse 112 of hot spot computer 200. When the data communication is terminated (YES at A212), the processing will proceed to S214. Otherwise (NO at S212), the processing will return to S210, and the data communication between portable phone 300 and hot spot computer 200 using Bluetooth communication unit 226 is continued.

At S214, CPU 220 performs disconnection processing of the data communication using Bluetooth communication unit 226.

Figure 12:
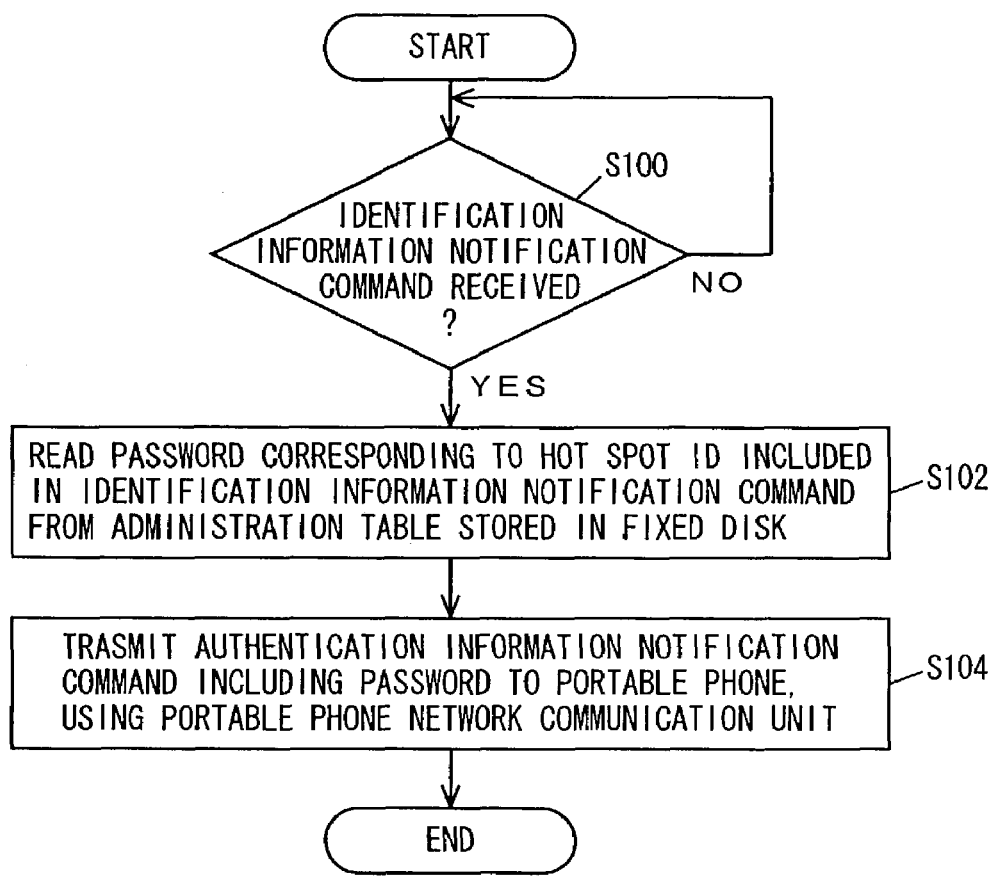
FIG. 12 is a flowchart of a processing performed in the server unit in the radio communication system according to Embodiment 1 of the present invention.

Referring to FIG. 12, a program executed in server unit 100 according to the present embodiment has the following control configuration.

At S100, CPU 120 of server unit 100 determines whether or not the identification information notification command (FIG. 8) is received from portable phone 300. The determination is carried out based on the information received from portable phone 300 via portable phone network communication unit 126. When the identification information notification command is received (YES at S100), the processing will proceed to S102. Otherwise (NO at S100), the processing will return to S100, and waits until the identification information notification command is received from portable phone 300.

At S102, CPU 120 reads from the administration table (FIG. 5) stored in fixed disk 124, the password corresponding to the hot spot ID included in the identification information notification command (FIG. 8). At S104, CPU 120 uses portable phone network communication unit 126 to transmit the authentication information notification command (FIG. 9) including the password to portable phone 302.

An operation of the radio communication system according to the present embodiment, based on the above-described configuration and flowcharts, will be described.

When the user of portable phone 300 inputs the search request of the hot spot computer from operation unit 312 of the portable phone 300 (YES at S300), the search request command (FIG. 6) is broadcast using Bluetooth communication unit 340 (S302).

Hot spot computer 200 within coverage of Bluetooth communication unit 340 of portable phone 300 receives the search request command (FIG. 6) (YES at S200). Hot spot computer 200 uses Bluetooth communication unit 226 to transmit the search response command (FIG. 7) to portable phone 300 that has transmitted the search request command (S202).

Portable phone 300 receives the search response command (FIG. 7) transmitted from hot spot computer 200 (YES at S304). Portable phone 300 uses portable phone network communication unit 330 to transmit the identification information notification command (FIG. 8) to server unit 100 (S306). When server unit 100 receives the identification information notification command (FIG. 8) (YES at S100), the password corresponding to the hot spot ID included in the identification information notification command (FIG. 8) is read from the administration table (FIG. 5) stored in fixed disk 124 (S102). Server 100 uses portable phone network communication unit 126 to transmit the authentication information notification command (FIG. 9) including the password to portable phone 300 (S104).

When portable phone 300 receives the authentication information notification command (FIG. 9) (YES at S308), it sets the password of the authentication information notification command in Bluetooth communication unit 340 (S310). Portable phone 300 uses Bluetooth communication unit 340 to start data communication between portable phone 300 and hot spot computer 200 (S312). Here, an authentication processing is performed between portable phone 300 and hot spot computer 200, based on the password set in Bluetooth communication unit 340.

When hot spot computer 200 receives the data communication connection request (YES at S204), it reads the password from memory 122 (S206). The read password is set in Bluetooth communication unit 226 (S208), and data communication is started between portable phone 300 and hot spot computer 200, using Bluetooth communication unit 226 (S210). Here, the authentication processing is performed using the password set in Bluetooth communication unit 340 of portable phone 300 and the password set in Bluetooth communication unit 226 of hot spot computer 200, and only when it is successful, communication is permitted.

The user of portable phone 300 requests termination of data communication during data communication (YES at S314), or hot spot computer 200 requests termination of data communication (YES at S212). Then, the disconnection processing for data communication is performed in portable phone 300 and hot spot computer 200 respectively (S316, S214).

As described above, according to the radio communication system in the present embodiment, it is not necessary to store the authentication information and the identification information of the portable phone, which is the other party of communication, in the hot spot computer. Data communication is established only when the password stored in the memory of the hot spot computer matches the password obtained from the server unit by the portable phone. Therefore, even if the hot spot computer is not connected to the server unit, and even if the identification information and the authentication information of the portable phone, which is the other party of communication, are not stored in the hot spot computer, the radio communication system capable of implementing authentication of a high security level can be provided.

Embodiment 2

In the following, a radio communication system according to Embodiment 2 of the present invention will be described. Here, the radio communication system according to the present embodiment has a hardware configuration similar to that according to the above-described Embodiment 1. Therefore, detailed description therefor will not be repeated.

Figures 13, 14:
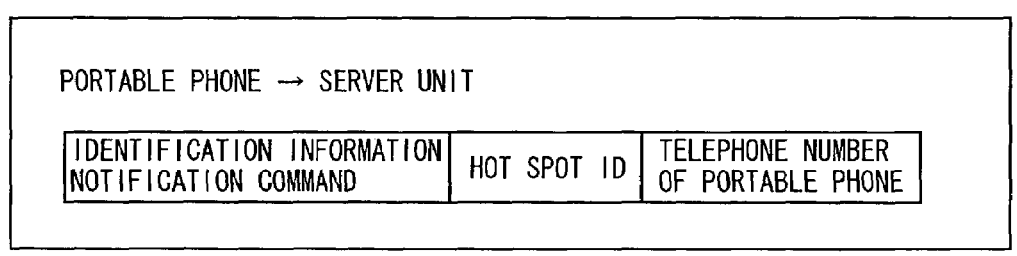
FIG. 13 shows a portable phone administration table stored in a fixed disk of a server unit according to Embodiment 2 of the present invention.
FIG. 14 shows an identification information notification command transmitted from a portable phone to the server unit according to Embodiment 2 of the present invention.

Referring to FIG. 13, a portable phone administration table stored in fixed disk 124 of server unit 100 according to the present embodiment will be described. As shown in FIG. 13, the portable phone administration table stores a telephone number of the portable phone for each registration ID. The portable phone administration table represents information registered in advance in server unit 100, when the user of portable phone 300 requests in advance communication with hot spot computer 200.

Referring to FIG. 14, according to the present embodiment, the identification information notification command transmitted from portable phone 300 to server unit 100 will be described. As shown in FIG. 14, the identification information notification command includes the hot spot ID and the telephone number of portable phone 300.

Figure 15:
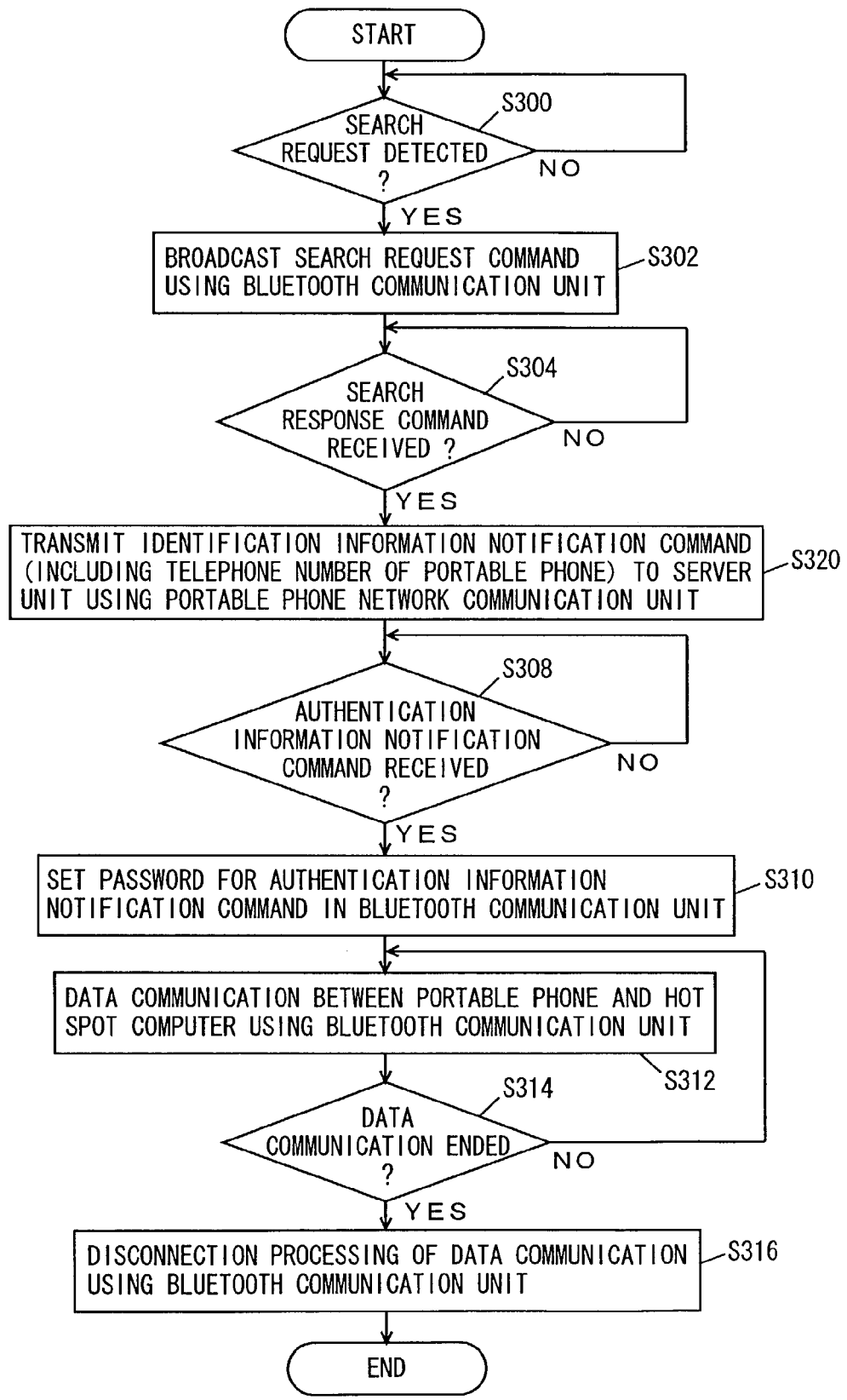
FIG. 15 is a flowchart of a processing performed in the portable phone in a radio communication system according to Embodiment 2 of the present invention.

Referring to FIG. 15, a program executed in portable phone 300 according to the present embodiment has the following control configuration. It is to be noted that, in the flowchart shown in FIG. 15, the same step numbers are provided to the same process steps as in the flowchart shown in aforementioned FIG. 10. The processing therein is also the same. Therefore, detailed description therefor will not be repeated.

At S320, control unit 320 of portable phone 300 uses portable phone network communication unit 330 to transmit the identification information notification command (a command including the telephone number of the portable phone, and shown in FIG. 14) to server unit 100.

Figure 16:
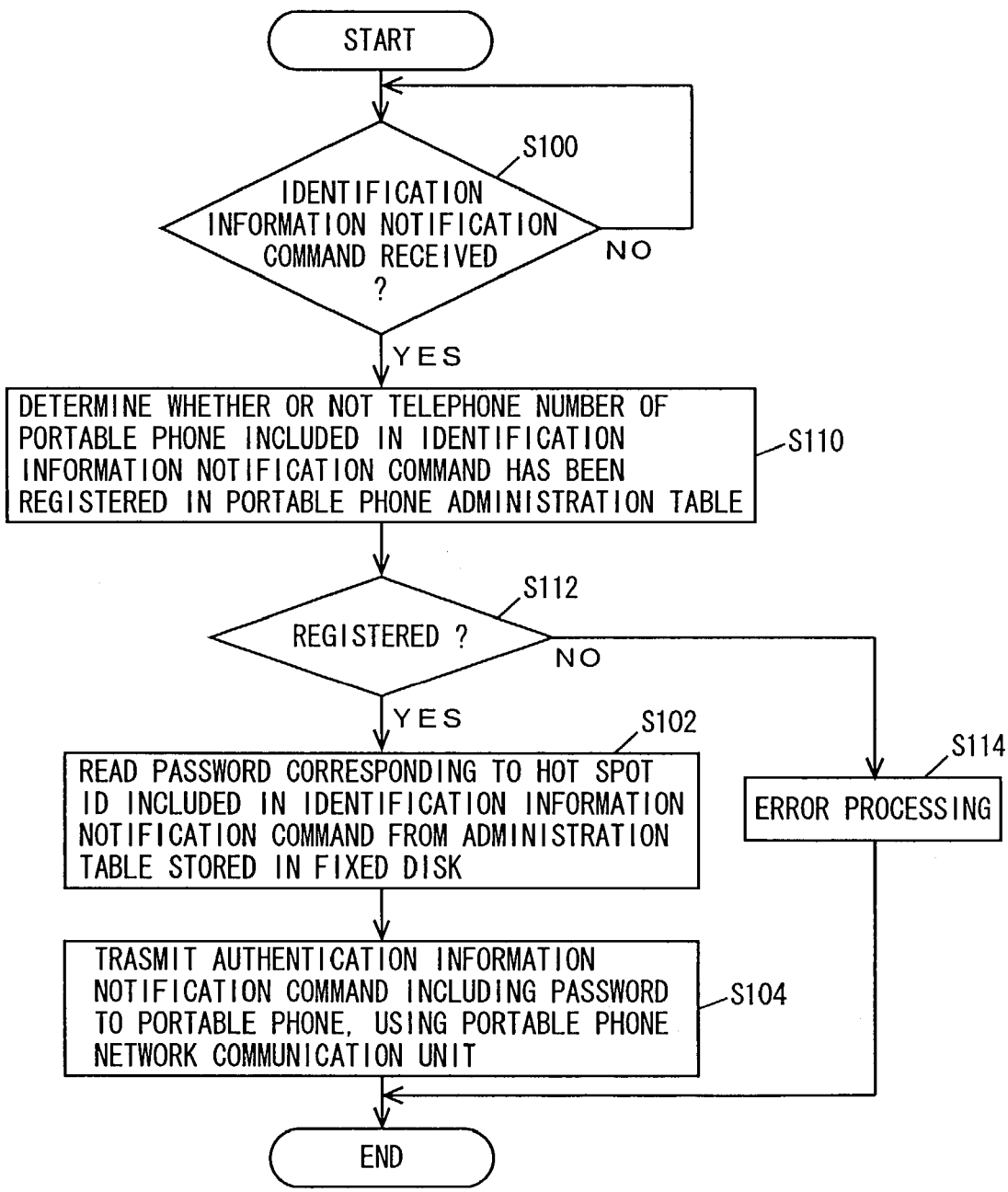
FIG. 16 is a flowchart of a processing performed in the server unit in the radio communication system according to Embodiment 2 of the present invention.

Referring to FIG. 16, a program executed in server unit 100 according to the present embodiment has the following control configuration. It is to be noted that, in the flowchart shown in FIG. 16, the same step numbers are provided to the same process steps as in the flowchart shown in aforementioned FIG. 12. The processing therein is also the same. Therefore, detailed description therefor will not be repeated.

At step S110, CPU 120 determines whether or not the telephone number of the portable phone included in the identification information notification command (FIG. 14) is registered in the portable phone administration table (FIG. 13). At S112, when the telephone number is registered in the portable phone administration table (YES at S112), the processing will proceed to S102. Otherwise (NO at S112), the processing will move to S114.

At S114, CPU performs an error processing. In the error processing at S114, CPU 120 of server unit 100 uses portable phone network communication unit 126 to notify portable phone 300 of the fact that the telephone number is not registered in the portable phone administration table.

An operation of the radio communication system according to the present embodiment based on the above-described configuration and the flowchart will be described. It is to be noted that the operation similar to that in aforementioned Embodiment 1 will not be repeated.

When the user of portable phone 300 uses portable phone 300 to broadcast the search request command (S302), and when the search response command is received (YES at S304), portable phone 300 uses portable phone network communication unit 330 to transmit the identification information notification command (FIG. 4) to server unit 100.

When server unit 100 receives the identification information notification command (FIG. 14) (YES at S100), it determines whether or not the telephone number of the portable phone included in the identification information notification command is registered in the portable phone administration table (FIG. 13) (S110). When the telephone number is registered (YES at S112), the password corresponding to the hot spot ID included in the identification information notification command is read from the administration table stored in fixed disk 124 (S102), and the authentication information notification command including the password is transmitted to portable phone 300 using portable phone network communication unit 126.

As described above, according to the radio communication system in the present embodiment, the password needed in communication between the portable phone and the hot spot computer is transmitted only to the pre-registered telephone number of the portable phone. Thus, further higher security level can be ensured.

Embodiment 3

In the following, a radio communication system according to Embodiment 3 of the present invention will be described.

Figure 17:
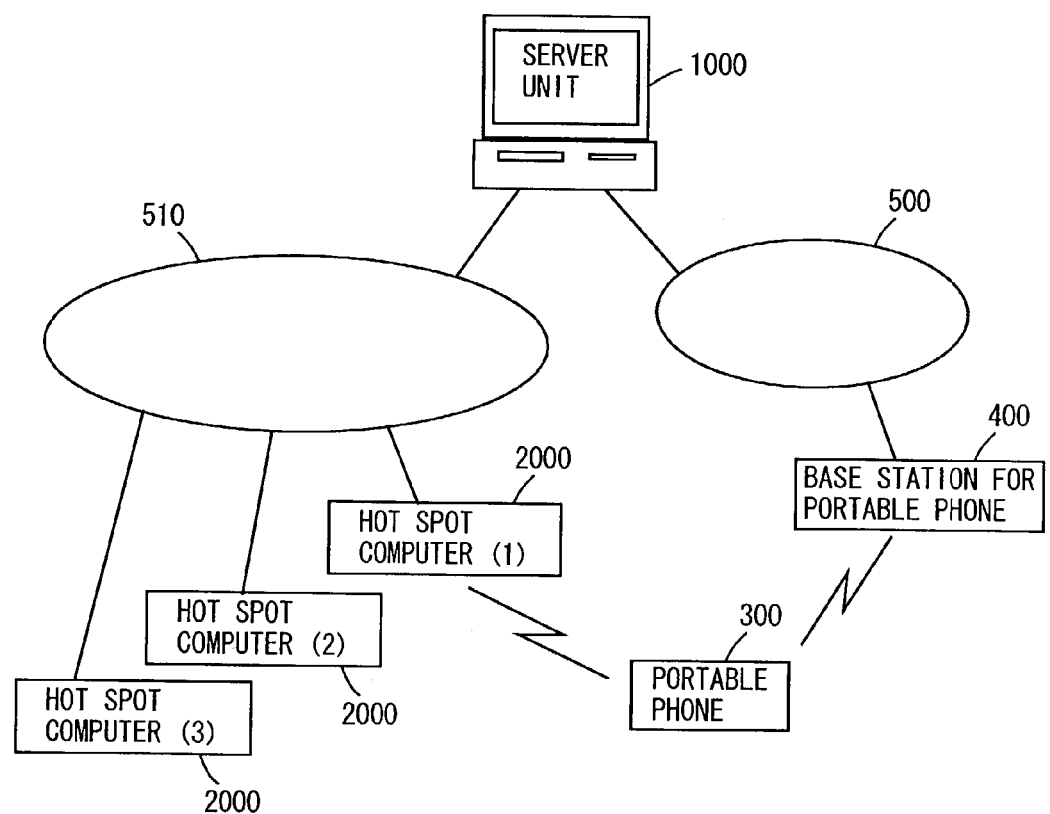
FIG. 17 shows a configuration of a radio communication system according to Embodiment 3 of the present invention.

FIG. 17 shows an overall configuration of the radio communication system according to the present embodiment. It is to be noted that, in the overall configuration shown in FIG. 17, the same reference characters are given to the same components as in the overall configuration shown in aforementioned FIG. 1. Functions thereof are also the same. Therefore, detailed description therefor will not be repeated. As shown in FIG. 17, the radio communication system according to the present embodiment includes a server unit 1000 and a hot spot computer 2000 having a function different from those according to aforementioned Embodiment 1. Server unit 1000 is connected to hot spot computer 2000 via a network 510. Here, portable phone network 500 may be separate from network 510 as shown in FIG. 10, or alternatively, may be similar. In addition, the first communication means implemented by the first communication unit may be the same as the third communication means implemented by the third communication unit.

Figure 18:
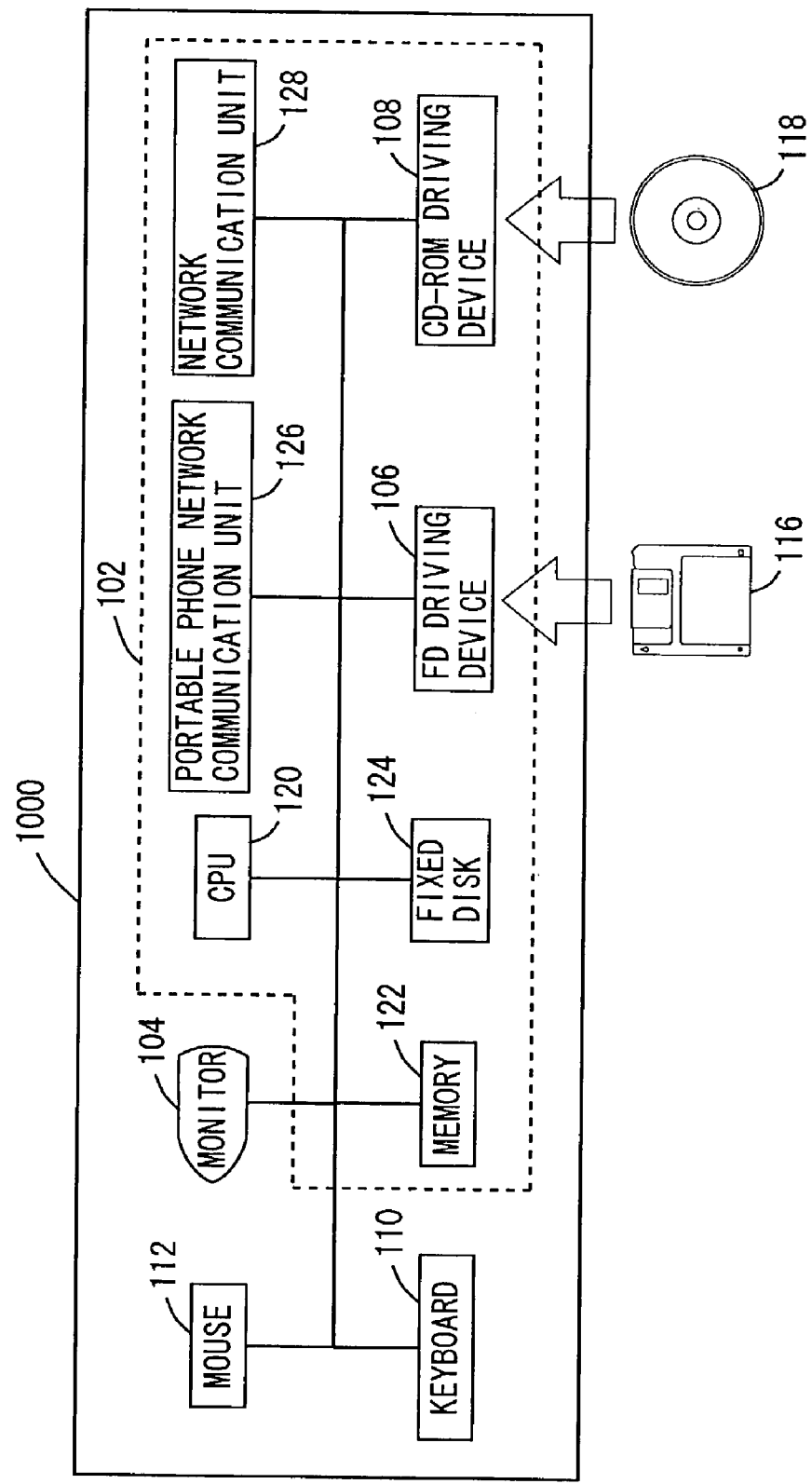
FIG. 18 is a control block diagram of a server unit in the radio communication system shown in FIG. 7.

Referring to FIG. 18, a control block in server unit 1000 according to the present embodiment will be described. It is to be noted that, in the control block shown in FIG. 18, the same reference characters are given to the same components as those shown in aforementioned FIG. 2. Therefore, detailed description therefore will not be repeated. Server unit 1000 includes a network communication unit 128, in addition to server unit 100 according to aforementioned Embodiment 1. Network communication unit 128 serves for communication between server unit 1000 and hot spot computer 2000 via network 510.

Figure 19:
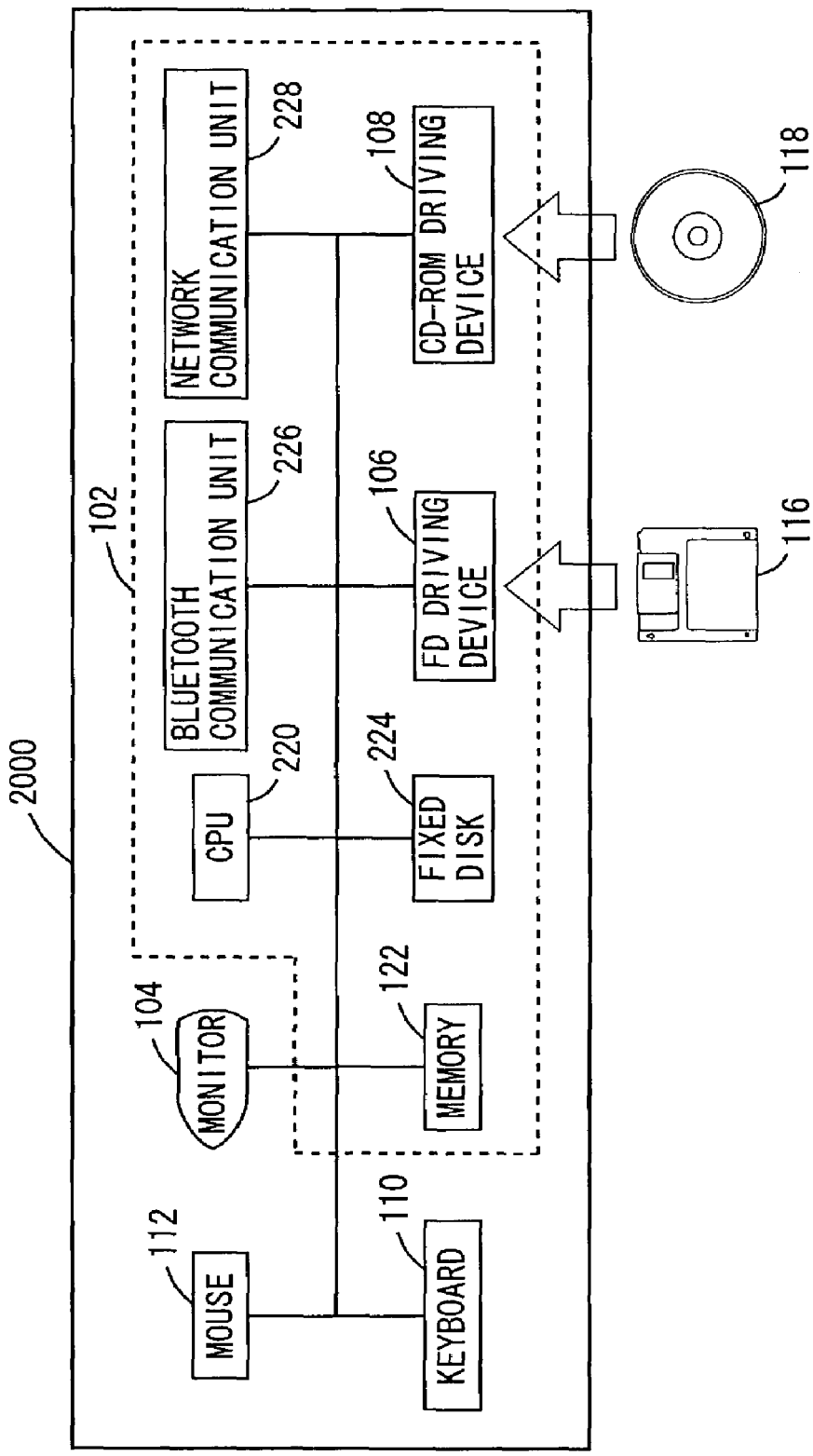
FIG. 19 is a control block diagram of a hot spot computer in the radio communication system shown in FIG. 7.

Referring to FIG. 19, a control block in the hot spot computer according to the present embodiment will be described. Here, with regard to the control block of the hot spot computer as well, network communication unit 228 is added to hot spot computer 200 according to aforementioned Embodiment 1, as in the control block of server unit 1000. Other configuration is the same as in the control block shown in FIG. 3 of aforementioned Embodiment 1. Therefore, detailed description therefor will not be repeated.

Figure 20:
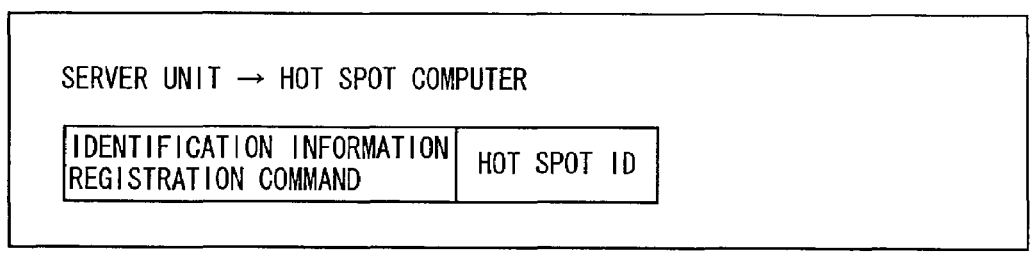
FIG. 20 shows an identification information registration command transmitted from the server unit to the hot spot computer according to Embodiment 3 of the present invention.
Figure 21:
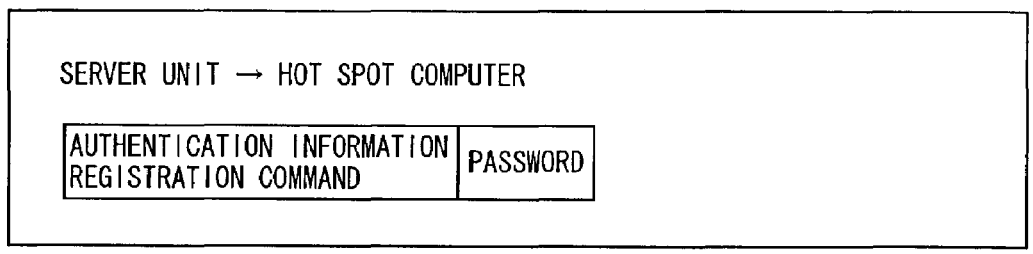
FIG. 21 shows an authentication information registration command transmitted from the server unit to the hot spot computer according to Embodiment 3 of the present invention.

According to the present embodiment, FIG. 20 shows an identification information registration command transmitted from server unit 1000 to hot spot computer 2000, and FIG. 21 shows an authentication information registration command transmitted from server unit 1000 according to the present embodiment to hot spot computer 2000. As shown in FIG. 20, the identification information registration command includes the hot spot ID, and, as shown in FIG. 21, the authentication information registration command includes the password.

Figure 22:
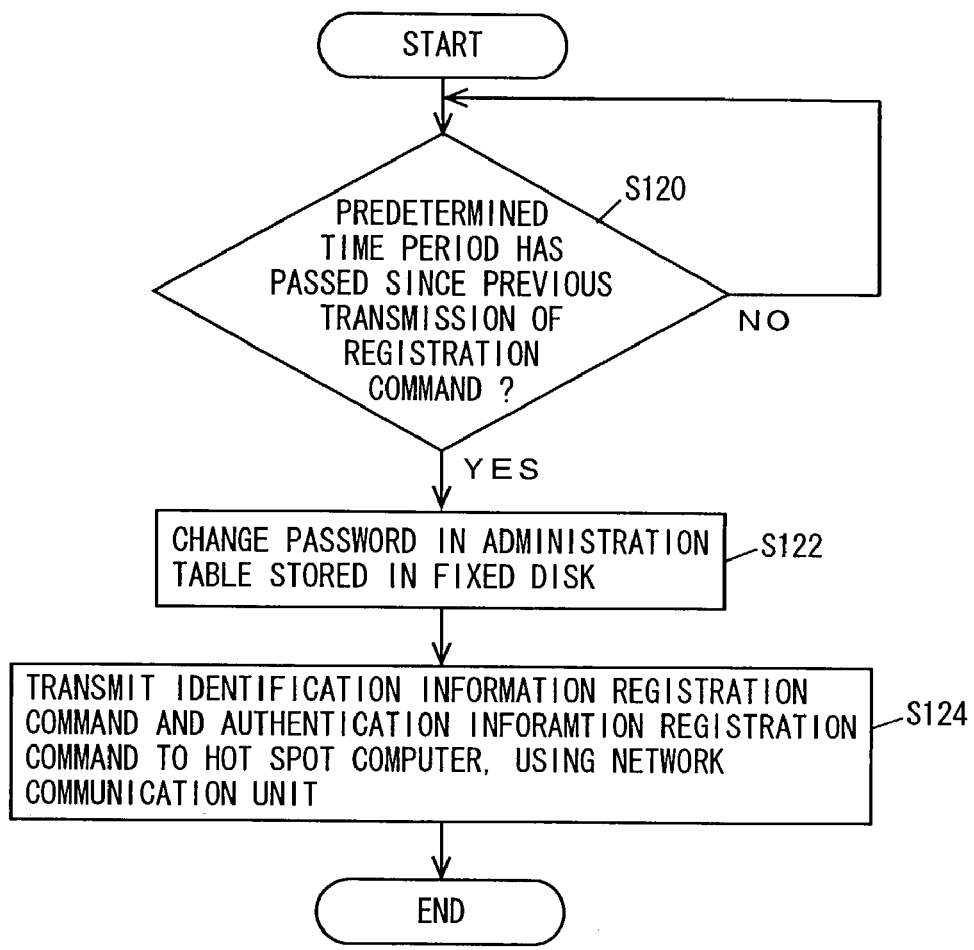
FIG. 22 is a flowchart of a processing performed in the server unit of the radio communication system according to Embodiment 3 of the present invention.

Referring to FIG. 22, a program executed in server unit 1000 according to the present embodiment has the following control configuration.

At S120, CPU 120 of server unit 1000 determines whether or not a predetermined time period has passed since previous transmission of the registration command. When the predetermined time period has passed since previous transmission of the registration command (YES at S120), the processing will proceed to S122. Otherwise (NO at S120), the processing will return to S120, and waits until the predetermined time period passes from previous transmission of the registration command.

At S122, CPU 120 changes the password in the administration table (FIG. 5) stored in fixed disk 124. At S124, CPU 120 uses network communication unit 128 to transmit the identification information registration command (FIG. 20) and the authentication information registration command (FIG. 21) to hot spot computer 2000.

Figure 23:
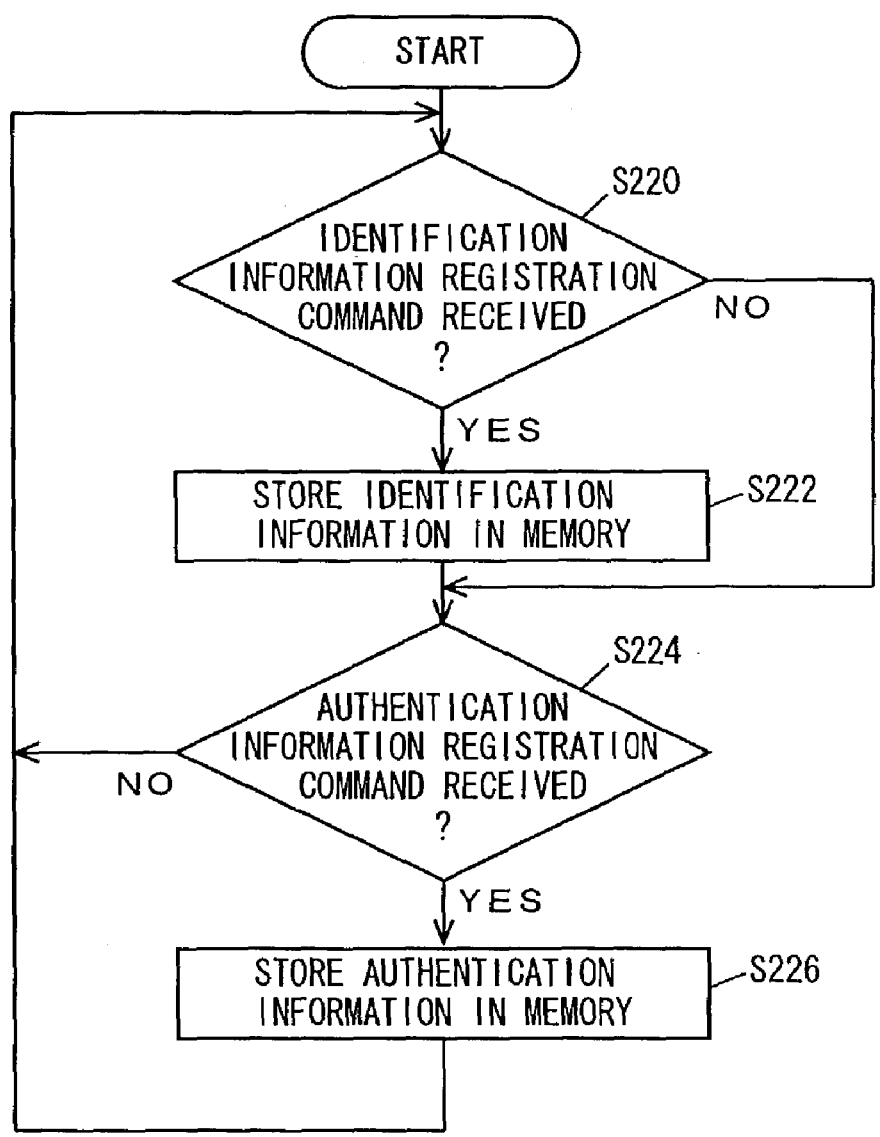
FIG. 23 is a flowchart of a processing performed in the hot spot computer of the radio communication system according to Embodiment 3 of the present invention.

Referring to FIG. 23, a program executed in hot spot computer 2000 according to the present embodiment has the following control configuration.

At S220, CPU 220 of hot spot computer 2000 determines whether or not the identification information registration command (FIG. 20) is received. When the identification information registration command is received (YES at S220), the processing will proceed to S222. Otherwise (NO at S220), the processing will move to S224.

At S222, CPU stores the received identification information in memory 122.

At S224, CPU 220 determines whether or not the authentication information registration command (FIG. 21) is received. When the authentication information registration command is received (YES at S224), the processing will proceed to S226. Otherwise (NO at S224), the processing will return to S220.

At S226, CPU 220 stores the received authentication information in memory 122. Thereafter, the processing will return to S220. Note that the identification information registration command and the authentication information registration command transmitted from server unit 100 to hot spot computer 200 are transmitted in a corresponding combination in the administration table shown in FIG. 5, respectively.

An operation of the radio communication system according to the present embodiment based on the above-described configuration and flowchart will be described. In server unit 1000, when the predetermined time period has passed since previous transmission of the registration command (YES at S120), the password in the administration table (FIG. 5) stored in fixed disk 124 is changed. Here, CPU 120 of server unit 1000 changes the password in the administration table (FIG. 5) to an arbitrary character string, or the like. Server unit 1000 uses network communication unit 128 to transmit the identification information registration command (FIG. 20) and the authentication information registration command (FIG. 21) to hot spot computer 2000 (S124).

When hot spot computer 2000 receives the identification information registration command (FIG. 20) from server unit 1000 (YES at S220), it stores the hot spot ID of the received identification information registration command in memory 122 (S222). When hot spot computer 2000 receives the authentication information registration command (FIG. 21) from server unit 1000 (YES at S224), it stores the password of the received authentication information registration command in memory 122 (S226).

As described above, according to the radio communication system in the present embodiment, when a predetermined condition is satisfied in the server unit (the predetermined time period has passed), the password stored in the administration table will be changed. Thus, the password is changed over time, and leakage of the password can be prevented.

Embodiment 4

In the following, a radio communication system according to Embodiment 4 of the present invention will be described. Here, the radio communication system according to the present embodiment has a hardware configuration similar to that according to above-described Embodiment 3. Therefore, detailed description therefor will not be repeated.

Figure 24:
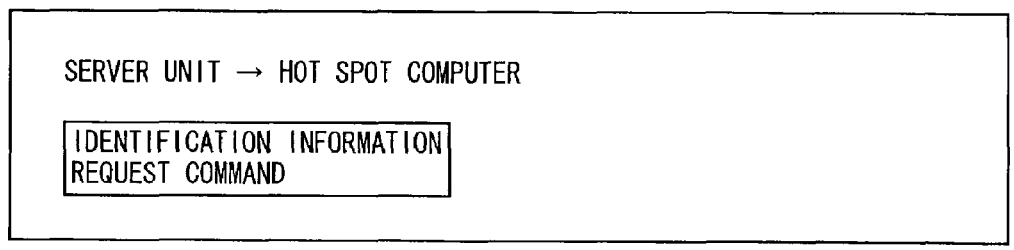
FIG. 24 shows an identification information request command transmitted from a server unit to a hot spot computer according to Embodiment 4 of the present invention.
Figure 25:
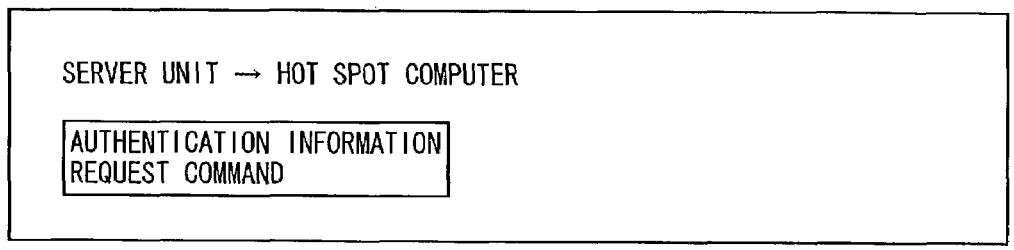
FIG. 25 shows an authentication information request command transmitted from the server unit to the hot spot computer according to Embodiment 4 of the present invention.
Figure 26:
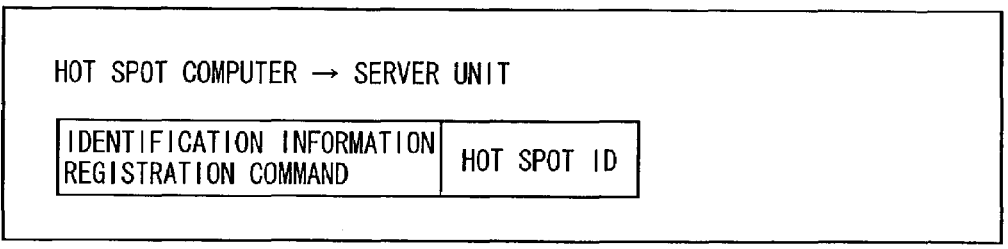
FIG. 26 shows an identification information notification command transmitted from the hot spot computer to the server unit according to Embodiment 4 of the present invention.
Figure 27:
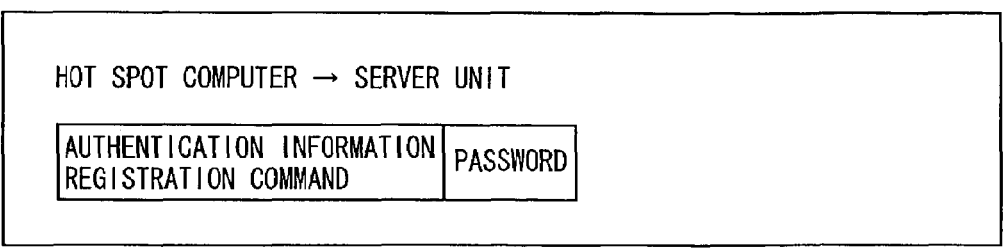
FIG. 27 shows an authentication information notification command transmitted from the hot spot computer to the server unit according to Embodiment 4 of the present invention.

According to the present embodiment, FIG. 24 shows an identification information request command transmitted from server unit 1000 to hot spot computer 2000; FIG. 25 shows an authentication information request command transmitted from server unit 1000 to hot spot computer 2000; FIG. 26 shows an identification information registration command transmitted from hot spot computer 2000 to server unit 1000; and FIG. 27 shows an authentication information registration command transmitted from hot spot computer 2000 to server unit 1000. The identification information request command shown in FIG. 24 and the authentication information request command shown in FIG. 25 are transmitted to hot spot computer 2000, in creating or updating the administration table (FIG. 5) in server unit 1000. The identification information registration command shown in FIG. 26 includes the hot spot ID, and the authentication information registration command shown in FIG. 27 includes the password.

Figure 28:
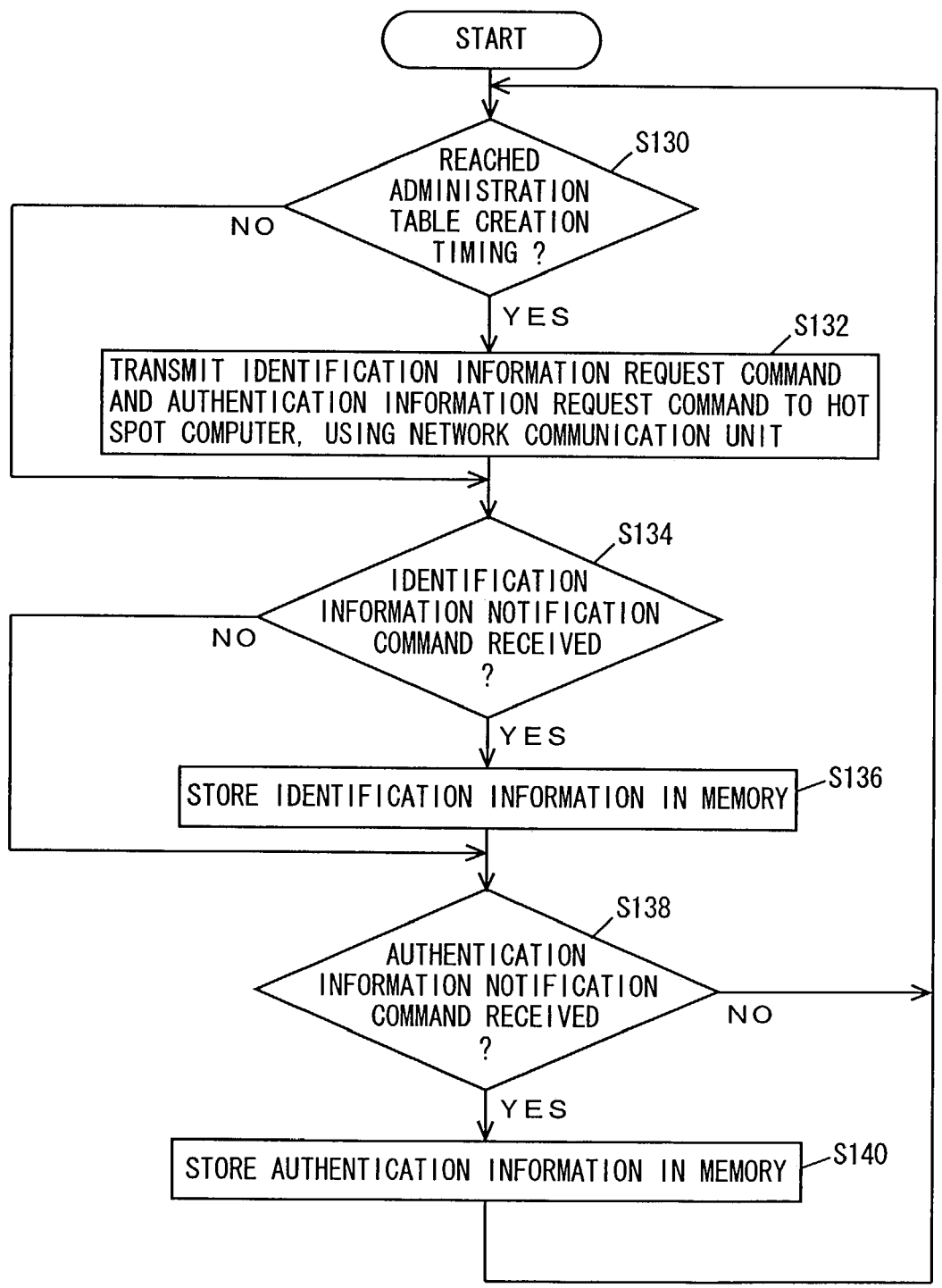
FIG. 28 is a flowchart of a processing performed in the server unit of the radio communication system according to Embodiment 4 of the present invention.

Referring to FIG. 28, a program executed in server unit 1000 according to the present embodiment has the following control configuration.

At S130, CPU 120 of server unit 1000 determines whether or not an administration table creation timing is reached. When the administration table creation timing is reached (YES at S130), the processing will proceed to S132. Otherwise (NO at S132), the processing will move to S134.

At S132, CPU 120 uses network communication unit 128 to transmit the identification information request command (FIG. 24) and the authentication information request command (FIG. 25) to hot spot computer 2000.

At S134, CPU 120 determines whether or not the identification information registration command (FIG. 26) is received. When the identification information registration command is received (YES at S134), the processing will proceed to S136. Otherwise (NO at S134), the processing will move to S138. At S136, CPU 120 stores in the memory, the identification information included in the received identification information registration command. At S138, CPU 120 determines whether or not the authentication information registration command (FIG. 27) is received. When the authentication information registration command is received (YES at S138), the processing will proceed to S140. Otherwise (NO at S138), the processing will return to S130. At S140, CPU 120 stores in memory 122, the authentication information included in the received authentication information registration command.

Figure 29:
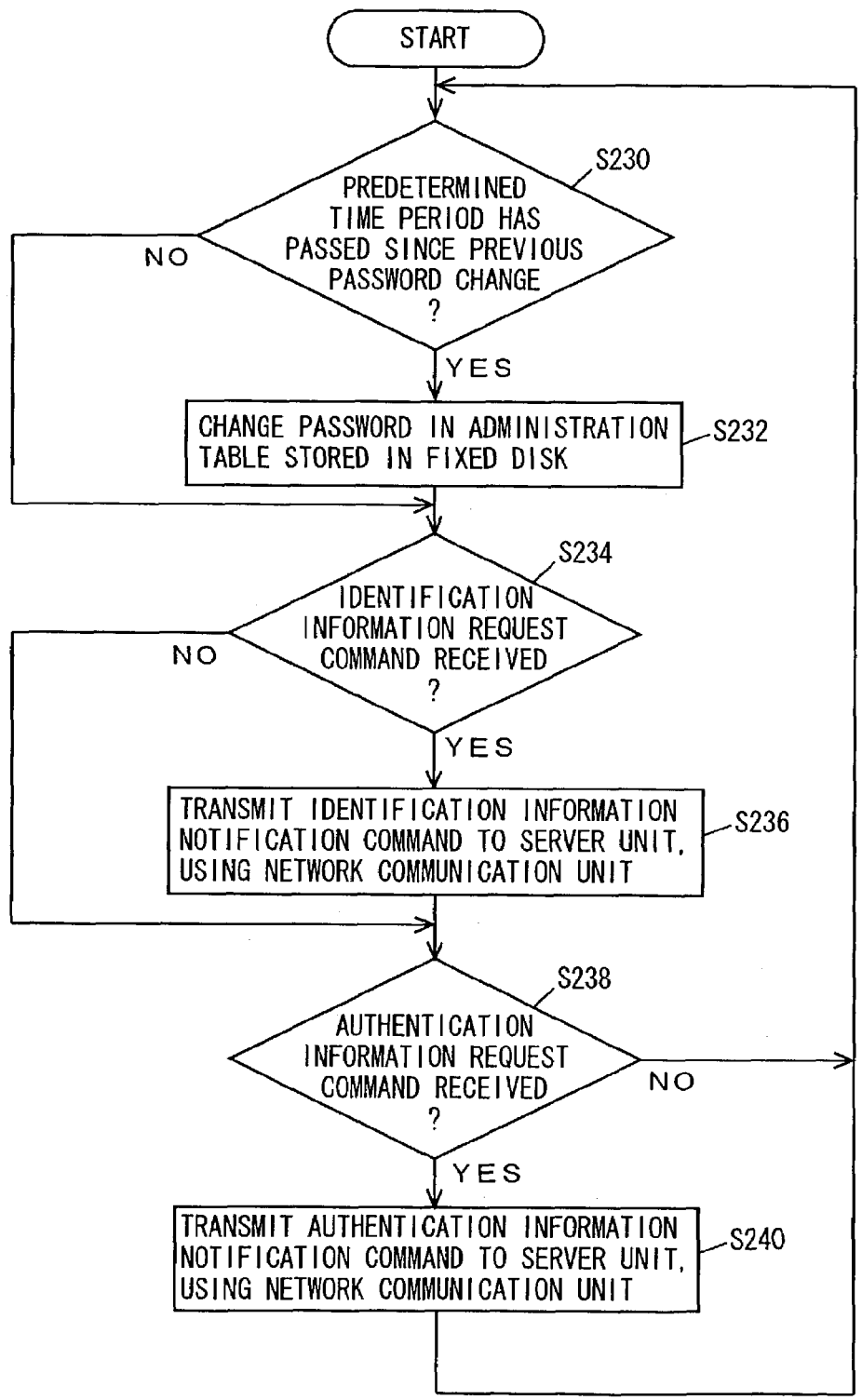
FIG. 29 is a flowchart of a processing performed in the hot spot computer of the radio communication system according to Embodiment 4 of the present invention.

Referring to FIG. 29, a program executed in hot spot computer 2000 according to the present embodiment has the following control configuration.

At S230, CPU 220 of hot spot computer 2000 determines whether or not a predetermined time period has passed since previous password change. When the predetermined time period has passed since previous password change (YES at S230), the processing will proceed to S232. Otherwise (NO at S230), the processing will move to S234. At S232, CPU 220 changes the password in the administration table (FIG. 5) stored in fixed disk 124.

At S234, CPU 220 determines whether or not the identification information request command (FIG. 24) is received. When the identification information request command is received (YES at S234), the processing will proceed to S236. Otherwise (NO at S234), the processing will move to S238. At S236, CPU 220 uses network communication unit 228 to transmit the identification information registration command (FIG. 26) to server unit 1000.

At S238, CPU 220 determines whether or not the authentication information request command (FIG. 25) is received from server unit 1000. When the authentication information request command is received (YES at S238), the processing will proceed to S240. Otherwise (NO at S238), the processing will move to S230. At S240, CPU 220 uses network communication unit 228 to transmit the authentication information registration command (FIG. 27) to server unit 1000. Thereafter, the processing will return to S230.

An operation of the radio communication system according to the present embodiment based on the above-described configuration and the flowchart will be described.

When a creation timing of the administration table (FIG. 5) is reached in server unit 1000 (YES at S130), server unit 1000 uses network communication unit 128 to transmit the identification information request command (FIG. 24) and the authentication information request command (FIG. 25) to hot spot computer 2000 (S132).

When hot spot computer 2000 receives the identification information request command (YES at S234), it uses network communication unit 228 to transmit the identification information registration command (FIG. 26) to server unit 1000 (S236). When hot spot computer 2000 receives the authentication information request command from server unit 1000 (YES at S238), it uses network communication unit 228 to transmit the authentication information registration command (FIG. 27) to server unit 1000 (S240).

In server unit 1000, when the identification information registration command (FIG. 26) is received from hot spot computer 2000 (YES at S134), server unit 1000 stores the identification information in memory 122 (S136). In server unit 1000, when the authentication information registration command (FIG. 27) is received from hot spot computer 2000 (YES at S138), server unit 1000 stores the authentication information in memory 122 (S140).

In addition, in hot spot computer 2000, when a predetermined time period has passed since the previous password change (YES at S230), the password in the administration table (FIG. 5) stored in fixed disk 124 is changed (S232).

As described above, according to the radio communication system in the present embodiment, the password is automatically changed on the hot spot computer side when the predetermined time period has passed since the password change. Therefore, leakage of the password can be prevented.

Embodiment 5

In the following, a radio communication system according to Embodiment 5 of the present invention will be described. Here, the radio communication system according to the present embodiment has a hardware configuration similar to that according to above-described Embodiment 3. Therefore, detailed description therefor will not be repeated.

Figure 30:
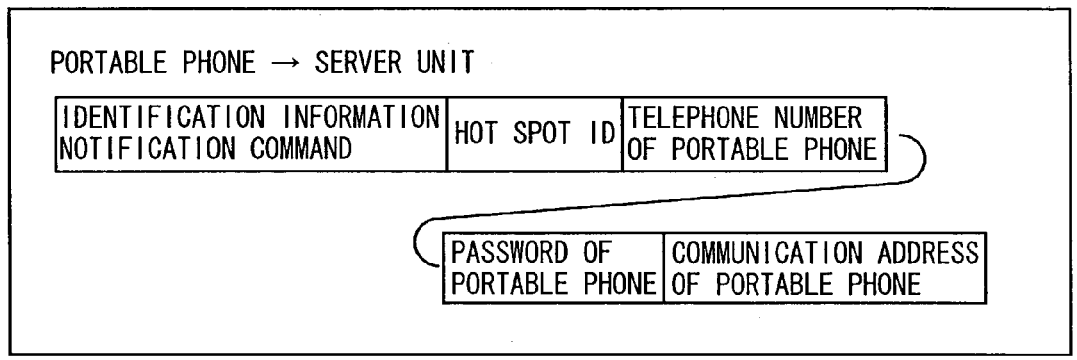
FIG. 30 shows an identification information notification command transmitted from a portable phone to a server unit according to Embodiment 5 of the present invention.
Figure 31:
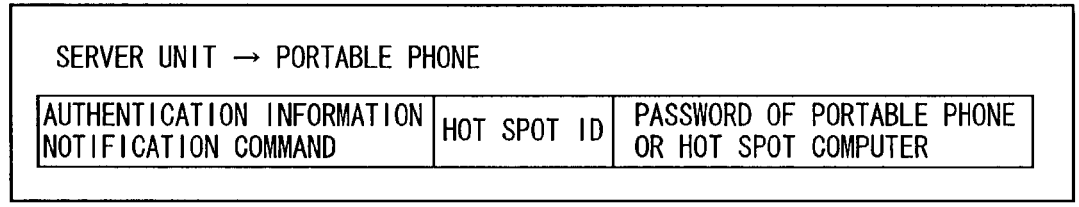
FIG. 31 shows an authentication information notification command transmitted from the server unit to the portable phone according to Embodiment 5 of the present invention.
Figure 32:
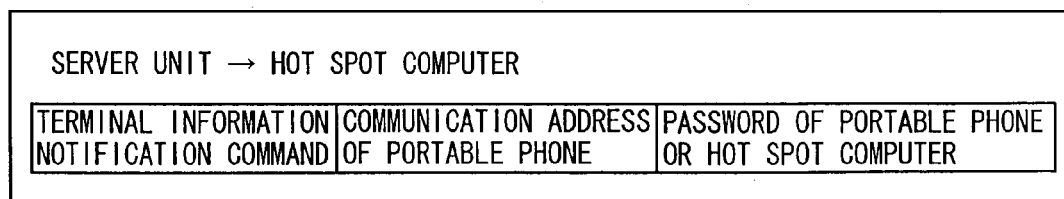
FIG. 32 shows a terminal information notification command transmitted from the server unit to a hot spot computer according to Embodiment 5 of the present invention.

According to the present embodiment, FIG. 30 shows an identification information notification command transmitted from portable phone 300 to server unit 1000; FIG. 31 shows an authentication information notification command transmitted from server unit 1000 to portable phone 300; and FIG. 32 shows a terminal information notification command transmitted from server unit 1000 to hot spot computer 2000. As shown in FIG. 30, the identification information notification command includes the hot spot ID, and the telephone number, the password, and the communication address of the portable phone. As shown in FIG. 31, the authentication information notification command includes the hot spot ID, and the password of the portable phone or the hot spot computer. As shown in FIG. 32, the terminal information notification command includes the communication address of the portable phone, and the password of the portable phone or the hot spot computer.

Figure 33:
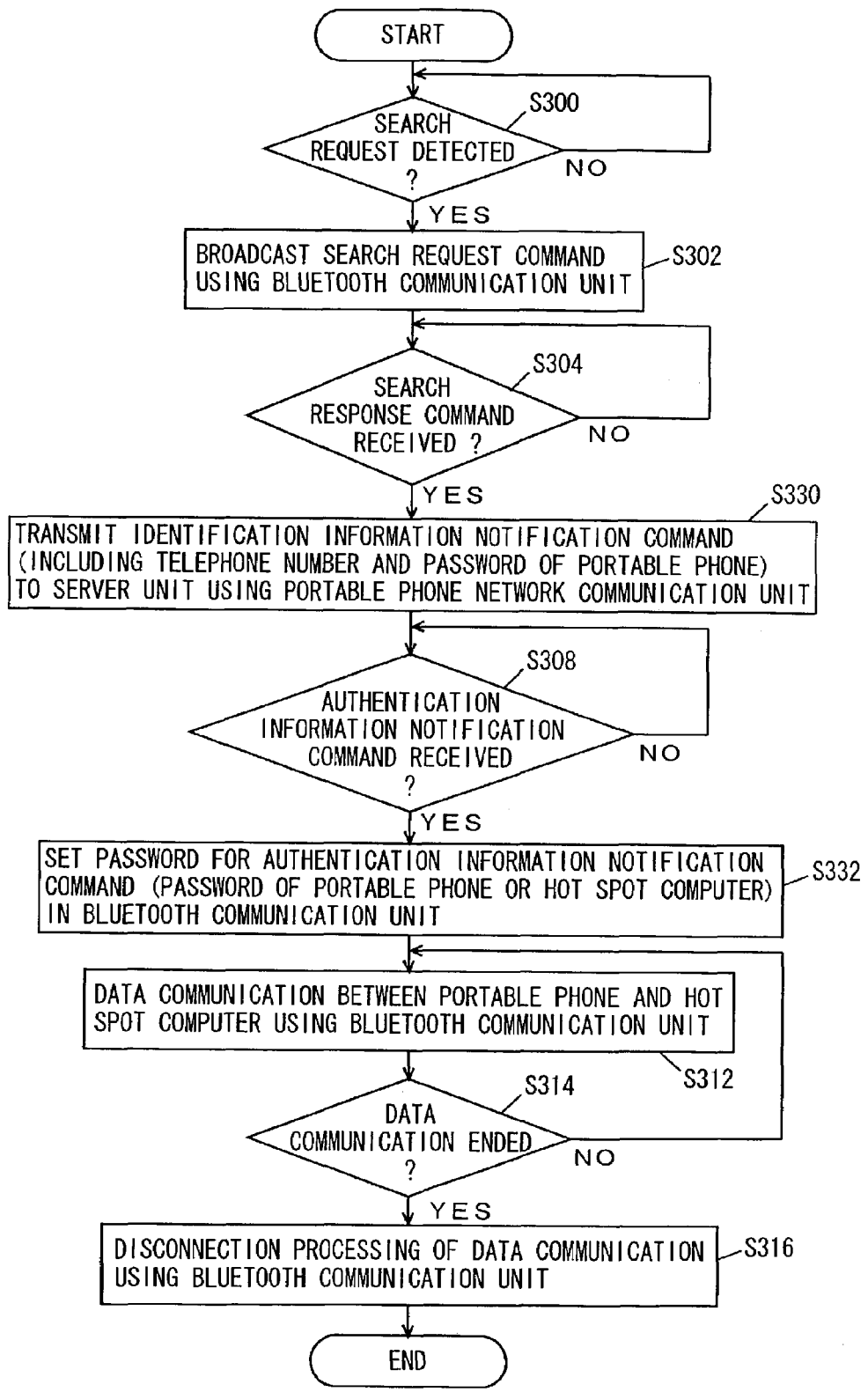
FIG. 33 is a flowchart of a processing performed in the portable phone in a radio communication system according to Embodiment 5 of the present invention.

Referring to FIG. 33, a program executed in portable phone 300 according to the present embodiment has the following control configuration. It is to be noted that, in the flowchart shown in FIG. 33, the same step numbers are provided to the same process steps as in the flowchart shown in aforementioned FIG. 10. The processing therein is also the same. Therefore, detailed description therefor will not be repeated.

At S330, control unit 320 of portable phone 300 uses portable phone network communication unit 330 to transmit the identification information notification command (FIG. 30) to server unit 1000. The identification information notification command transmitted at this time includes the telephone number and the password of the portable phone.

At S332, control unit 320 sets the password (password of the portable phone or the hot spot computer) included in the authentication information notification command (FIG. 31) received at S308 in Bluetooth communication unit 340.

Figure 34:
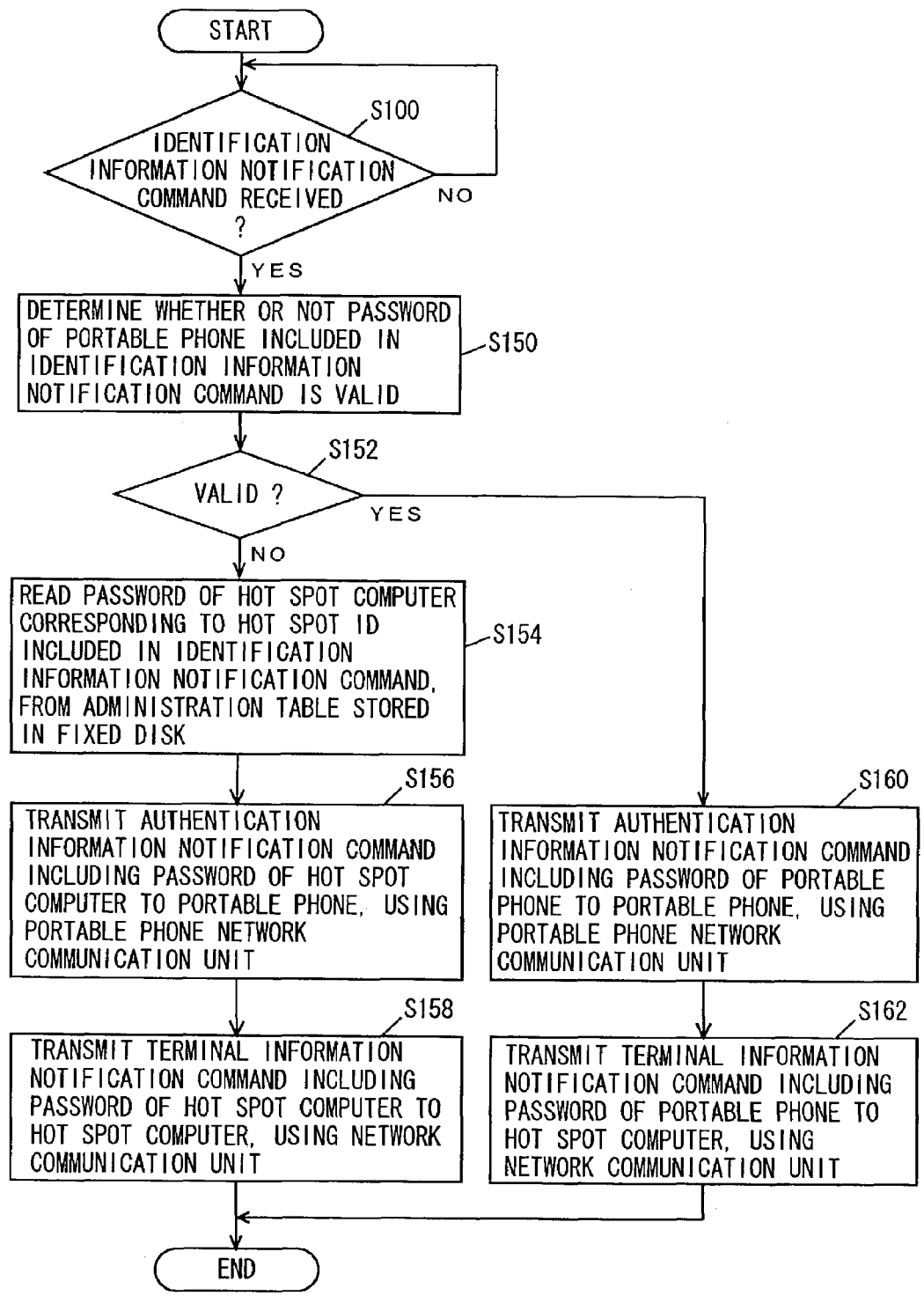
FIG. 34 is a flowchart of a processing performed in the server unit in the radio communication system according to Embodiment 5 of the present invention.

Referring to FIG. 34, a program executed in server unit 1000 according to the present embodiment has the following control configuration. It is to be noted that, in the flowchart shown in FIG. 34, the same step numbers are provided to the same process steps as in the flowchart shown in aforementioned FIG. 12. The processing therein is also the same. Therefore, detailed description therefor will not be repeated.

At S150, CPU 120 of server unit 1000 determines whether or not the password of the portable phone included in the identification information notification command (FIG. 30) is valid. At S152, when CPU 120 determines the password of the portable phone as valid (YES at S152), the processing will proceed to S160. Otherwise (NO at S152), the processing will move to S154.

At S154, CPU 120 reads from the administration table (FIG. 5) stored in fixed disk 124, the password of the hot spot computer corresponding to the hot spot ID included in the authentication information notification command (FIG. 30).

At S156, CPU 120 uses portable phone network communication unit 126 to transmit the authentication information notification command (FIG. 31) including the password of the hot spot computer to portable phone 300.

At S158, CPU 120 uses network communication unit 128 to transmit the terminal information notification command (FIG. 32) including the password of the hot spot computer to hot spot computer 2000.

At S160, CPU 120 uses portable phone network communication unit 126 to transmit the authentication information notification command (FIG. 31) including the password of the portable phone to portable phone 300.

At S162, CPU 120 uses network communication unit 128 to transmit the terminal information notification command (FIG. 32) including the password of the portable phone to hot spot computer 2000.

Figure 35A:
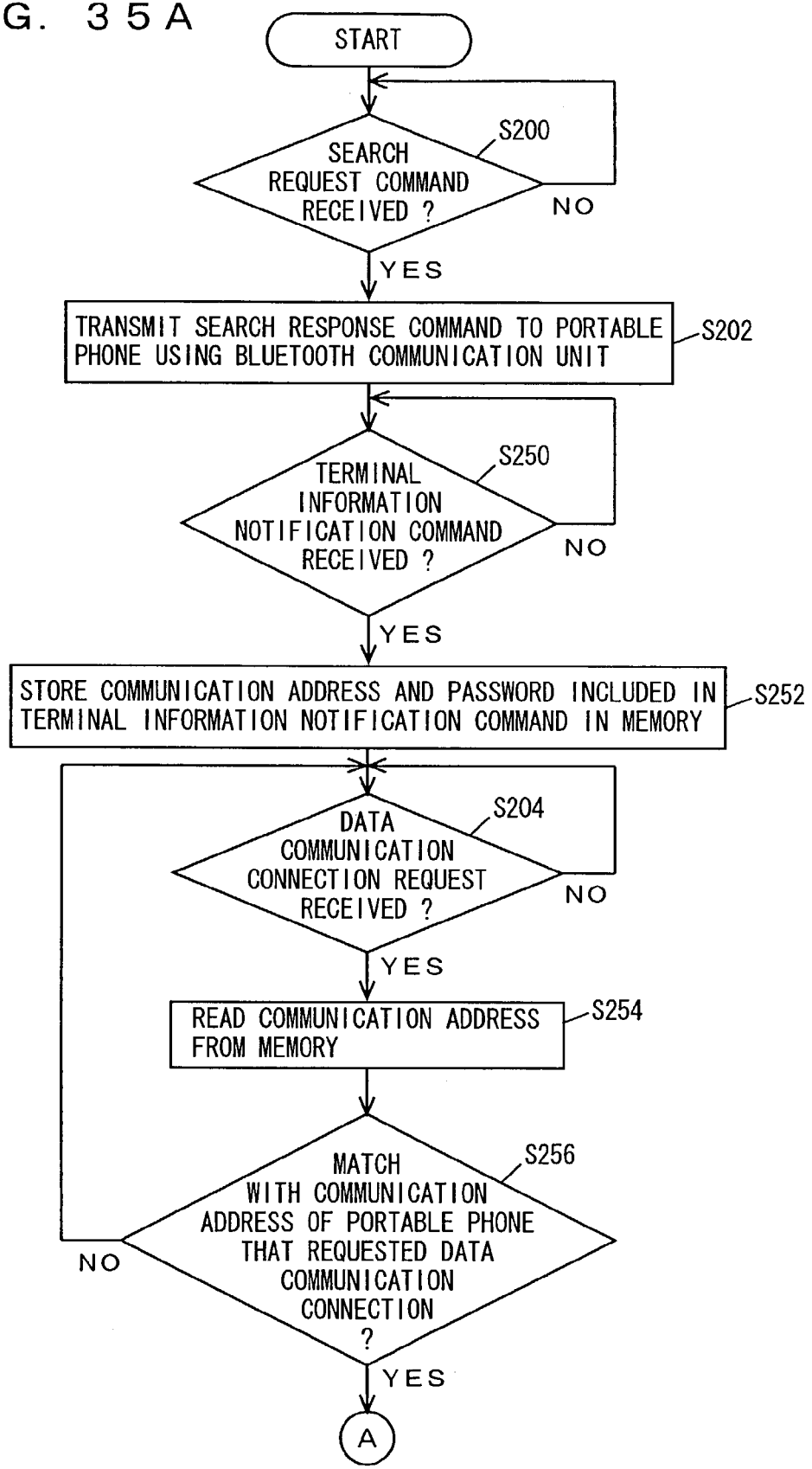
FIGS. 35A and 35B are flowcharts of a processing performed in the hot spot computer in the radio communication system according to Embodiment 5 of the present invention.
Figure 35B:
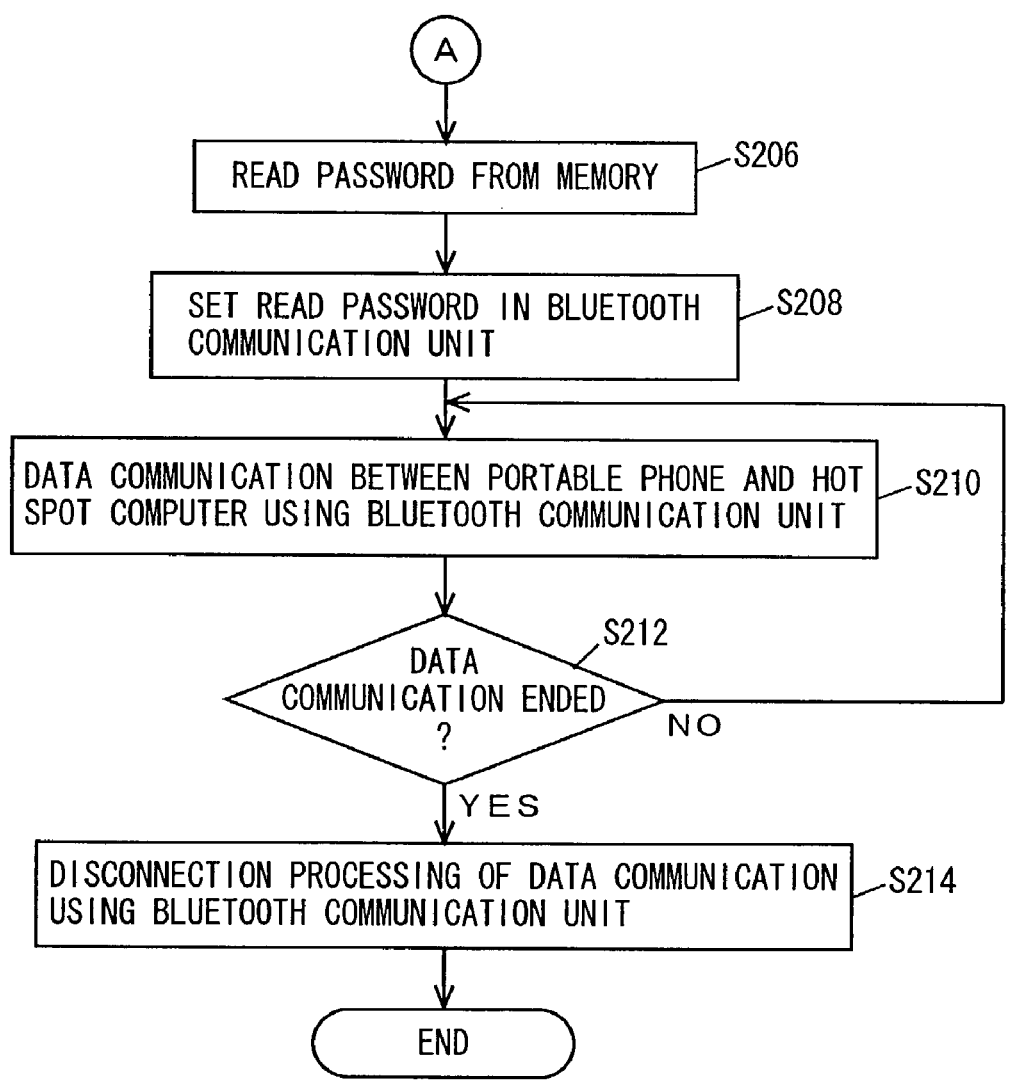

Referring to FIGS. 35A and 35B, a program executed in hot spot computer 2000 according to the present embodiment has the following control configuration. It is to be noted that, in the flowcharts shown in FIGS. 35A and 35B, the same step numbers are provided to the same process steps as in the flowchart shown in aforementioned FIG. 11. The processing therein is also the same. Therefore, detailed description therefor will not be repeated.

At S250, CPU 220 of hot spot computer 2000 determines whether or not the terminal information notification command (FIG. 32) is received. When the terminal information notification command is received (YES at S250), the processing will proceed to S252. Otherwise (NO at S250), the processing will return to S250, and waits until the terminal information notification command (FIG. 32) is received from server unit 1000.

At S252, CPU 220 stores the password and the communication address included in the terminal information notification command (FIG. 32) in memory 122. At S254, CPU 220 reads the communication address from memory 122. At S256, CPU 220 compares the communication address of the portable phone transmitted in requesting data communication connection with the communication address read from memory 122 to determine whether or not the communication addresses match. When the communication addresses match (YES at S256), the processing will proceed to S206. Otherwise (NO at S256), the processing will move to S204.

An operation of the radio communication system according to the present embodiment based on the above-described configuration and the flowchart will be described.

In portable phone 300, when the search response command is received from hot spot computer 2000 as a result of broadcasting the search request command (S302) (YES at S134), the identification information notification command (FIG. 30) is transmitted to server unit 1000, using portable phone network communication unit 330. Here, the identification information notification command transmitted to server unit 1000 includes the telephone number and the password of the portable phone.

In server unit 1000, when the identification information notification command (FIG. 30) is received (YES at S100), whether or not the password of the portable phone included in the identification information notification command (FIG. 30) is valid is determined (S150). When the password of the portable phone is valid (YES at S152), server unit 1000 transmits the authentication information notification command (FIG. 31) including the password of the portable phone to portable phone 300, and transmits the terminal information notification command (FIG. 32) including the password of the portable phone to hot spot computer 2000. On the other hand, when the password of the portable phone is not valid (NO at S152), the password of the hot spot computer corresponding to the hot spot ID included in the identification information notification command (FIG. 30) is read from the administration table (FIG. 5) stored in fixed disk 124 (S154). Server unit transmits the authentication information notification command (FIG. 31) including the read password of the hot spot computer to portable phone 300 (S156), and transmits the terminal information notification command (FIG. 32) including the password of the hot spot computer to hot spot computer 2000 (S158).

In portable phone 300, when the authentication information notification command (FIG. 31) is received from server unit 1000 (YES at S308), the password of the authentication information notification command (the password of the portable phone or the password of the hot spot computer) is set in Bluetooth communication unit 330 (S332).

In hot spot computer 2000, when the terminal information notification command (FIG. 32) is received from server unit 1000 (YES at S250), the password included in the terminal information notification command is stored in the memory (S252).

As described above, according to the radio communication system in the present embodiment, the password of the portable phone is transmitted from the portable phone to the server unit, in which validity of the password is verified. When the password of the portable phone is valid, the password of the portable phone is transmitted to the hot spot computer, and the password needed in communication between the portable phone and the hot spot computer is set. On the other hand, when the password of the portable phone is determined as invalid, the server unit reads the password of the hot spot computer from the administration table stored in the fixed disk, and transmits the password to the portable phone. Thus, a valid password is set in the portable phone and the hot spot computer.

Embodiment 6

In the following, a radio communication system according to Embodiment 6 of the present invention will be described. Here, the radio communication system according to the present embodiment has a hardware configuration similar to that according to the above-described Embodiment 1. In other words, server unit 100 is not connected to hot spot computer 200, as shown in FIG. 1.

FIG. 36 shows a charge administration table for each portable phone, stored in fixed disk 124 of server unit 100, and FIG. 37 shows a charge administration table for each hot spot computer, stored in fixed disk 124 of server unit 100. As shown in FIG. 36, the charge table includes charge information and statistic information for each telephone number of portable phone 300. As shown in FIG. 37, the charge administration table includes the charge information and the statistic information for each hot spot ID. The charge information shown in FIGS. 36 and 37 represents the charge information with respect to communication that has been established between portable phone 300 and hot spot computer 200. The statistic information represents information such as date and time, frequency, duration and the like, of the communication that has been established between portable phone 300 and hot spot computer 200.

FIG. 38 shows a charge information notification command transmitted from portable phone 300 according to the present embodiment to server unit 100; FIG. 39 shows a charge information request command transmitted from portable phone 300 to server unit 100; and FIG. 40 shows a total charge information notification command transmitted from server unit 100 to portable phone 300. As shown in FIG. 38, the charge information notification command includes the hot spot ID, the telephone number of the portable phone, duration, and an amount of communicated data. As shown in FIG. 39, the charge information request command includes the telephone number of the portable phone. As shown in FIG. 40, the total charge information notification command includes a totaled communication charge, a totaled duration, and a totaled amount of communicated data.

Figure 41A:
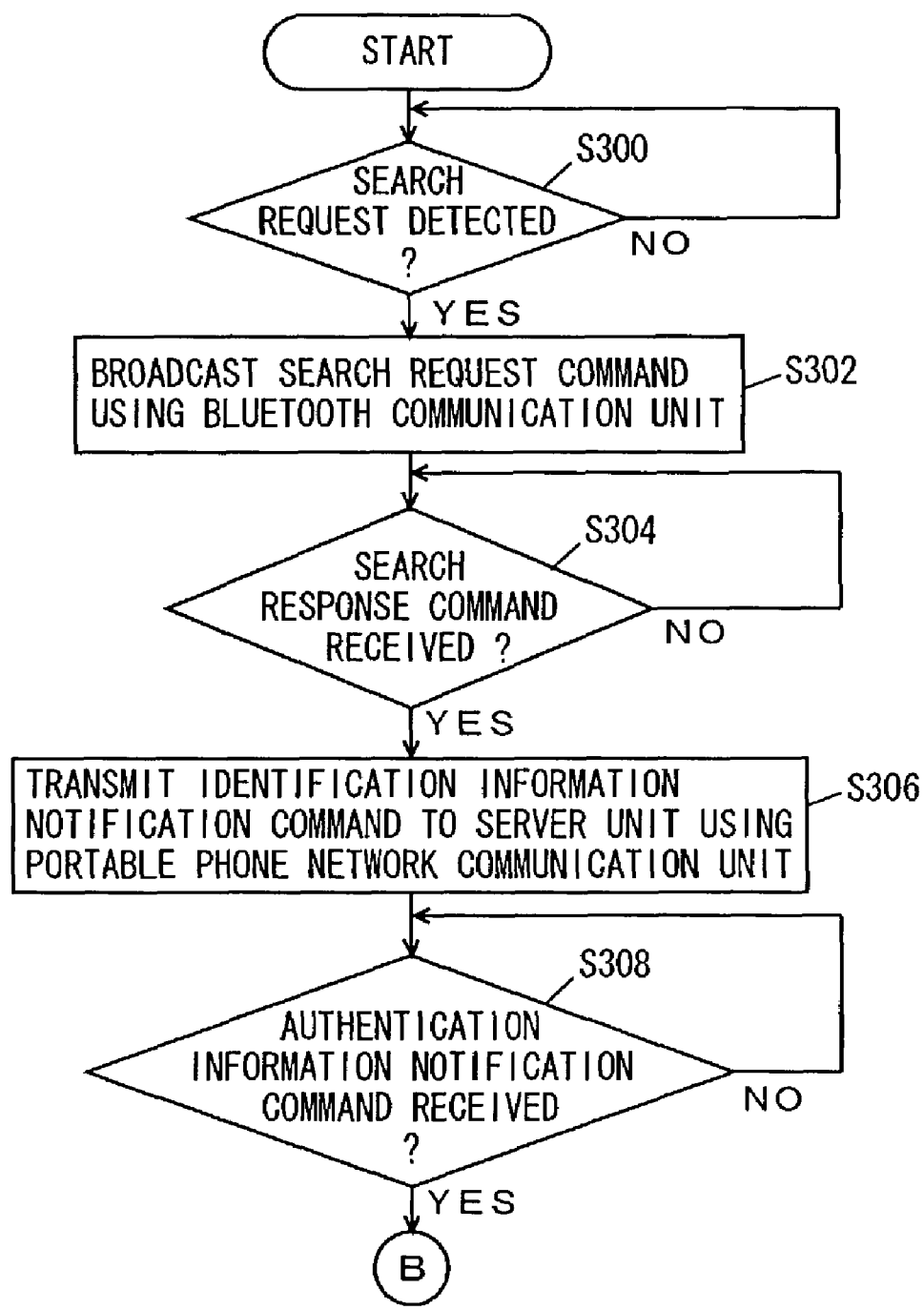
FIGS. 41A and 41B are flowcharts (No. 1) of a processing performed in the portable phone in a radio communication system according to Embodiment 6 of the present invention.
Figure 41B:
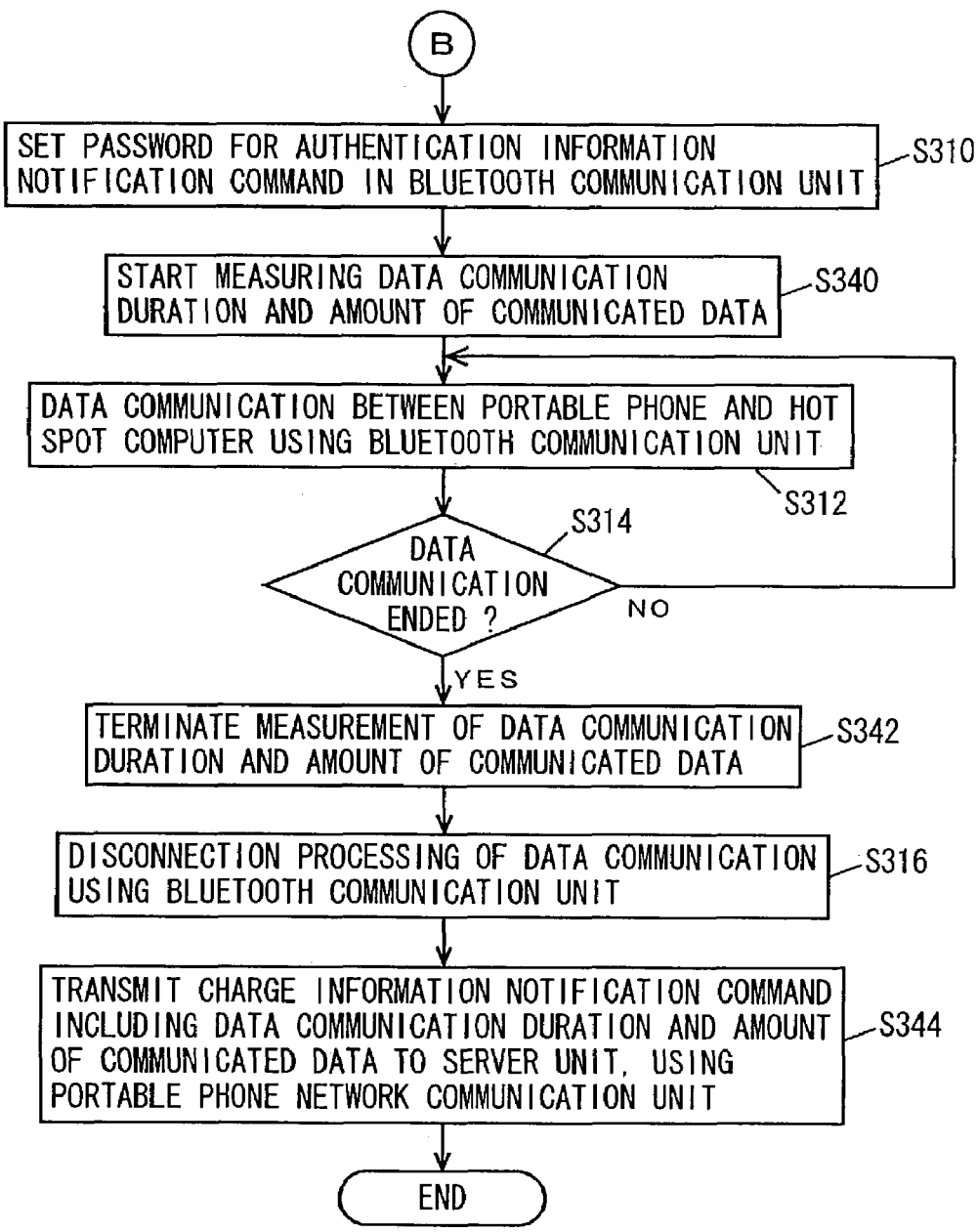

Referring to FIGS. 41A and 41B, a program executed in portable phone 300 according to the present embodiment has the following control configuration. It is to be noted that, in the flowcharts shown in FIGS. 41A and 41B, the same step numbers are provided to the same process steps as in the flowchart shown in aforementioned FIG. 10. The processing therein is also the same. Therefore, detailed description therefor will not be repeated.

At S340, control unit 320 of portable phone 300 starts measuring a data communication duration and the amount of communicated data. At S342, control unit 320 terminates measurement of the data communication duration and the amount of communicated data.

At S344, control unit 320 uses portable phone network communication unit 330 to transmit the charge information notification command (FIG. 38) including the data communication duration and the amount of communicated data to server unit 100.

Figure 42:
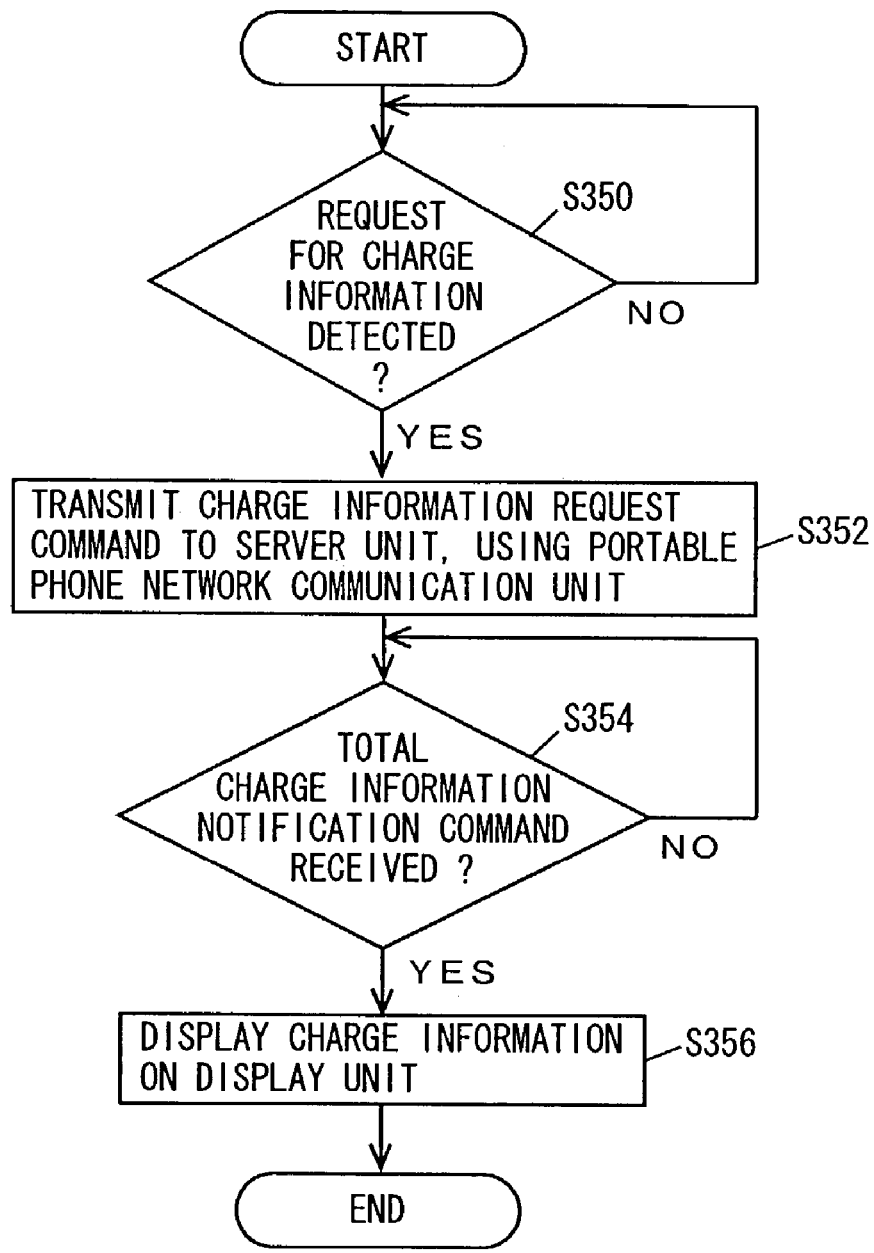
FIG. 42 is a flowchart (No. 2) of a processing performed in the portable phone in the radio communication system according to Embodiment 6 of the present invention.

Referring to FIG. 42, a program executed in the portable phone according to the present embodiment has the following control configuration, with regard to the charge information request processing.

At S350, control unit 320 of portable phone 300 determines whether or not a request for the charge information is detected. The request for the charge information is issued based on the information input through operation unit 312 of portable phone 300. When the request for the charge information is detected (YES at S350), the processing will proceed to S352. Otherwise (NO at S350), the processing will return to S350, and waits until the user of portable phone 300 inputs the request for the charge information.

At S352, control unit 320 uses portable phone network communication unit 330 to transmit the charge information request command (FIG. 39) to server unit 1000.

At S354, control unit 320 determines whether or not the total charge information notification command (FIG. 40) is received. When the total charge information notification command (FIG. 40) is received from server unit 100 (YES at S354), the processing will proceed to S356. Otherwise (NO at S354), the processing will return to S354, and waits until the total charge information notification command (FIG. 40) is received from server unit 100.

At S356, control unit 320 displays the received charge information on display unit 314.

Figure 43:
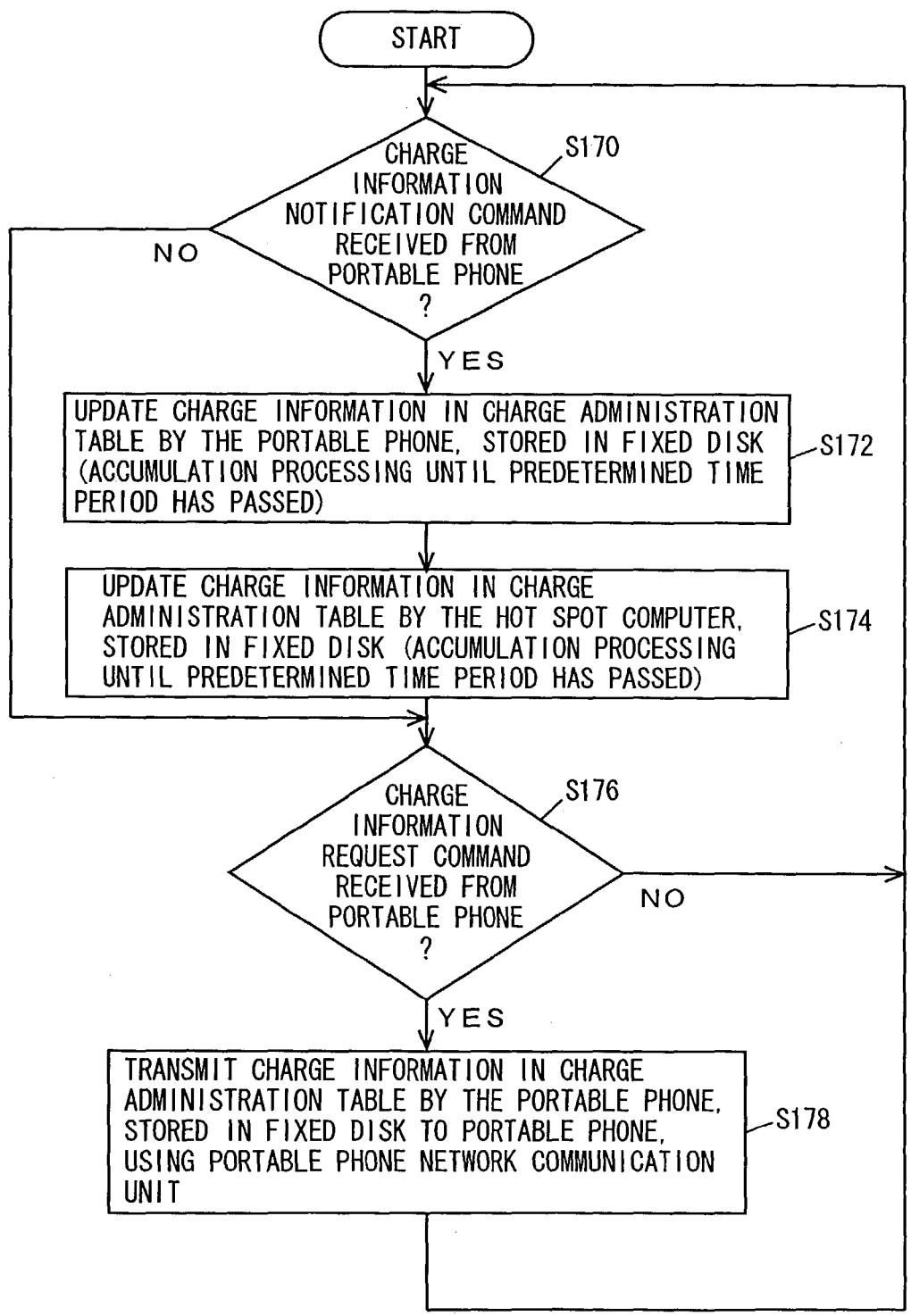
FIG. 43 is a flowchart of a processing performed in the server unit in the radio communication system according to Embodiment 6 of the present invention.

Referring to FIG. 43, a program executed in server unit 100 according to the present embodiment has the following control configuration.

At S170, CPU 120 of server unit 100 determines whether or not the charge information notification command (FIG. 38) is received from portable phone 300. When the charge information notification command is received from portable phone 300 (YES at S170), the processing will proceed to S172. Otherwise (NO at S170), the processing will move to S176.

At S172, CPU 120 updates the charge information in the charge administration table (FIG. 36) by the portable phone, stored in fixed disk 124. Here, an accumulation processing is performed until a predetermined time period has passed. In addition, a charged amount is calculated from the communication duration and the amount of communicated data.

At S174, CPU 120 updates the charge information in the charge administration table (FIG. 37) by the hot spot computer, stored in fixed disk 124. Here, an accumulation processing is performed until a predetermined time period has passed. In addition, in a manner similar to the processing at S172 described above, the charged amount is calculated from the communication duration and the amount of communicated data.

At S176, CPU 120 determines whether or not the charge information request command (FIG. 39) is received from portable phone 300. When the charge information request command is received from portable phone 300 (YES at S176), the processing will proceed to S178. Otherwise (NO at S176), the processing will return to S170.

At S178, CPU 120 uses portable phone network communication unit 126 to transmit to portable phone 300, the charge information in the charge administration table (FIG. 36) by the portable phone, stored in fixed disk 124.

An operation of the radio communication system according to the present embodiment based on the above-described configuration and the flowchart will be described.

Portable phone 300 starts measuring the data communication duration and the amount of communicated data, when data communication between portable phone 300 and hot spot computer 200 is initiated (S340). When the data communication is terminated (YES at S314), portable phone 300 terminates measurement of the data communication duration and the amount of communicated data (S342), and uses portable phone network communication unit 330 to transmit the charge information notification command (FIG. 38) including the data communication duration and the amount of communicated data to server unit 100 (S344).

In server unit 100, when the charge information notification command (FIG. 38) is received from portable phone 300 (YES at S170), the charge information in the charge administration table (FIG. 36) by the portable phone and in the charge administration table (FIG. 37) by the hot spot computer, stored in fixed disk 124 is updated (S172, S174).

In portable phone 300, when the user of portable phone 300 inputs a request of the charge information (YES at S350), the charge information request command (FIG. 39) is transmitted to server unit 100 with portable phone network communication unit 330 (S352).

In server unit 100, when the charge information request command (FIG. 39) is received from portable phone 300 (YES at S176), the charge information in the charge administration table (FIG. 36) by the portable phone, stored in fixed disk 124, is transmitted to portable phone 300 with portable phone network communication unit 126 (S178). In portable phone 300, when the total charge information notification command (FIG. 40) is received from server unit 100 (YES at S354), the charge information is displayed on display unit 314 (S356). In the above description, though only the charge information by the portable phone is transmitted to portable phone 300, the present invention is not limited to such an example, and the charge information by the hot spot computer may be transmitted to portable phone 300.

As described above, according to the radio communication system in the present embodiment, the charge information with respect to communication between the portable phone and the hot spot computer can be output with the portable phone.

Embodiment 7

In the following, a radio communication system according to Embodiment 7 of the present invention will be described. Here, the radio communication system according to the present embodiment has a hardware configuration similar to that according to above-described Embodiment 3. In other words, server unit 1000 communicates data with hot spot computer 2000 via network 510.

Figure 44:
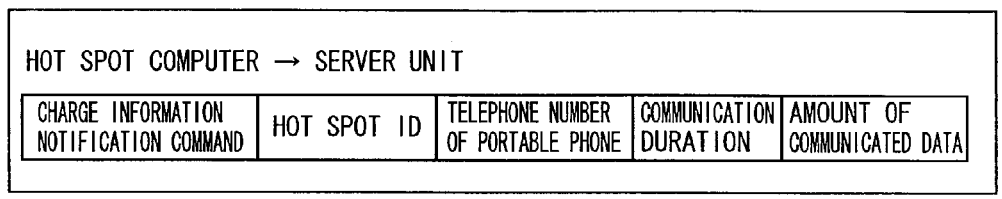
FIG. 44 shows a charge information notification command transmitted from a hot spot computer to a server unit according to Embodiment 7 of the present invention.
Figure 45:
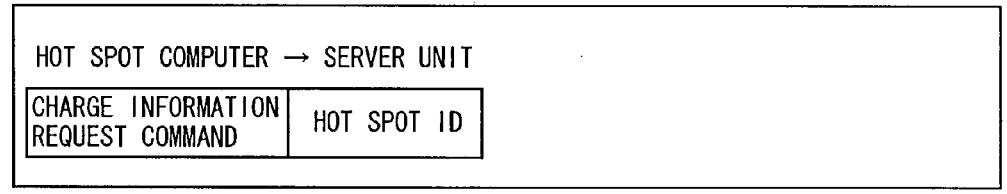
FIG. 45 shows a charge information request command transmitted from the hot spot computer to the server unit according to Embodiment 7 of the present invention.
Figure 46:
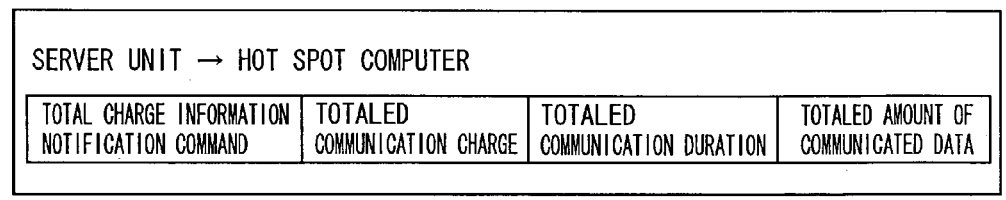
FIG. 46 shows a charge information request command transmitted from the server unit to the hot spot computer according to Embodiment 7 of the present invention.

FIG. 44 shows a charge information notification command transmitted from hot spot computer 2000 according to the present embodiment to server unit 1000; FIG. 45 shows a charge information request command transmitted from hot spot computer 2000 to server unit 1000; and FIG. 46 shows a total charge information notification command transmitted from server unit 1000 to hot spot computer 2000. As shown in FIG. 44, the charge information notification command includes the hot spot ID, the telephone number of the portable phone, duration, and the amount of communicated data. As shown in FIG. 45, the charge information request command includes the hot spot ID. As shown in FIG. 46, the total charge information notification command includes a totaled communication charge, a totaled duration, and a totaled amount of communicated data.

Figure 47A:
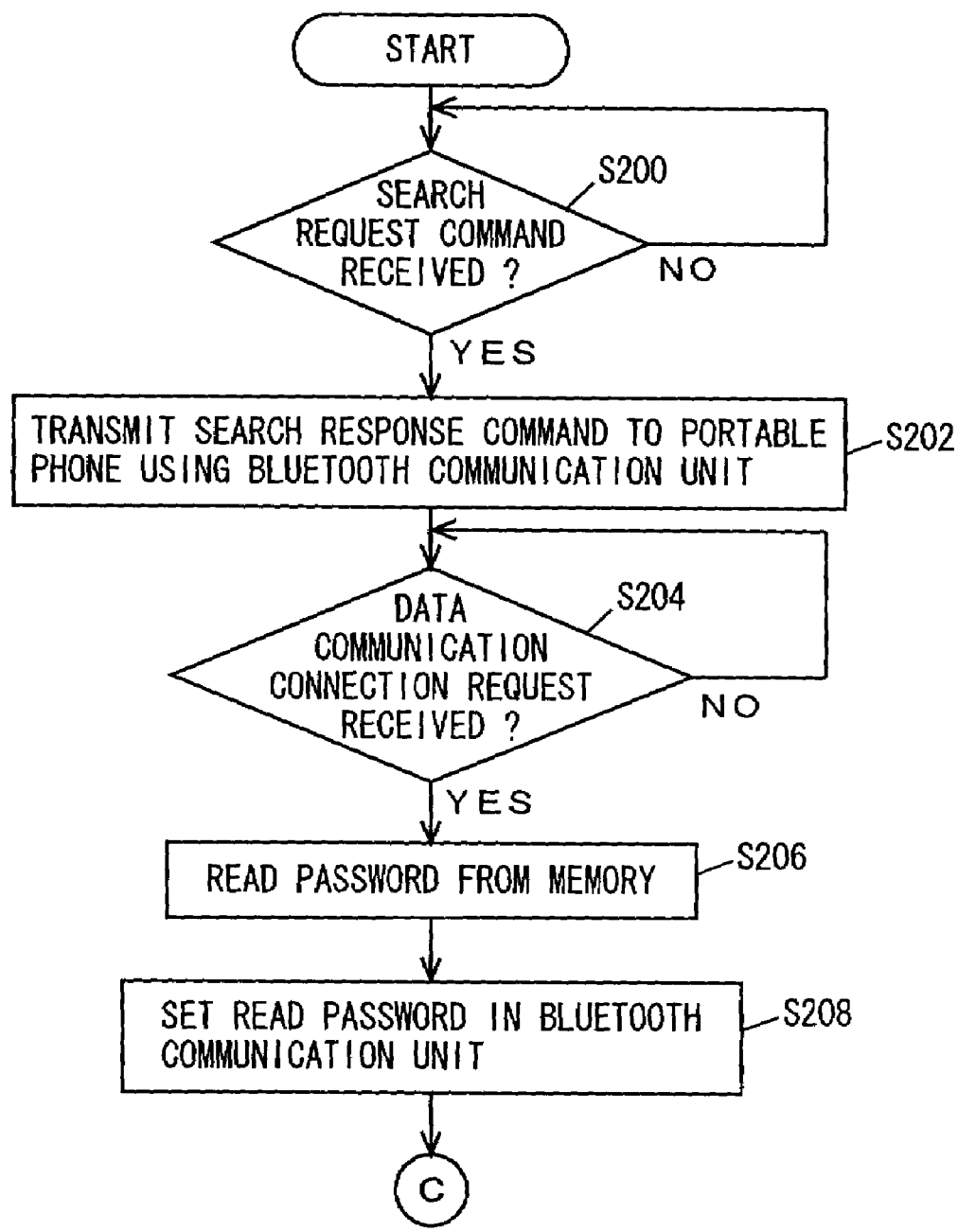
Figure 47B:
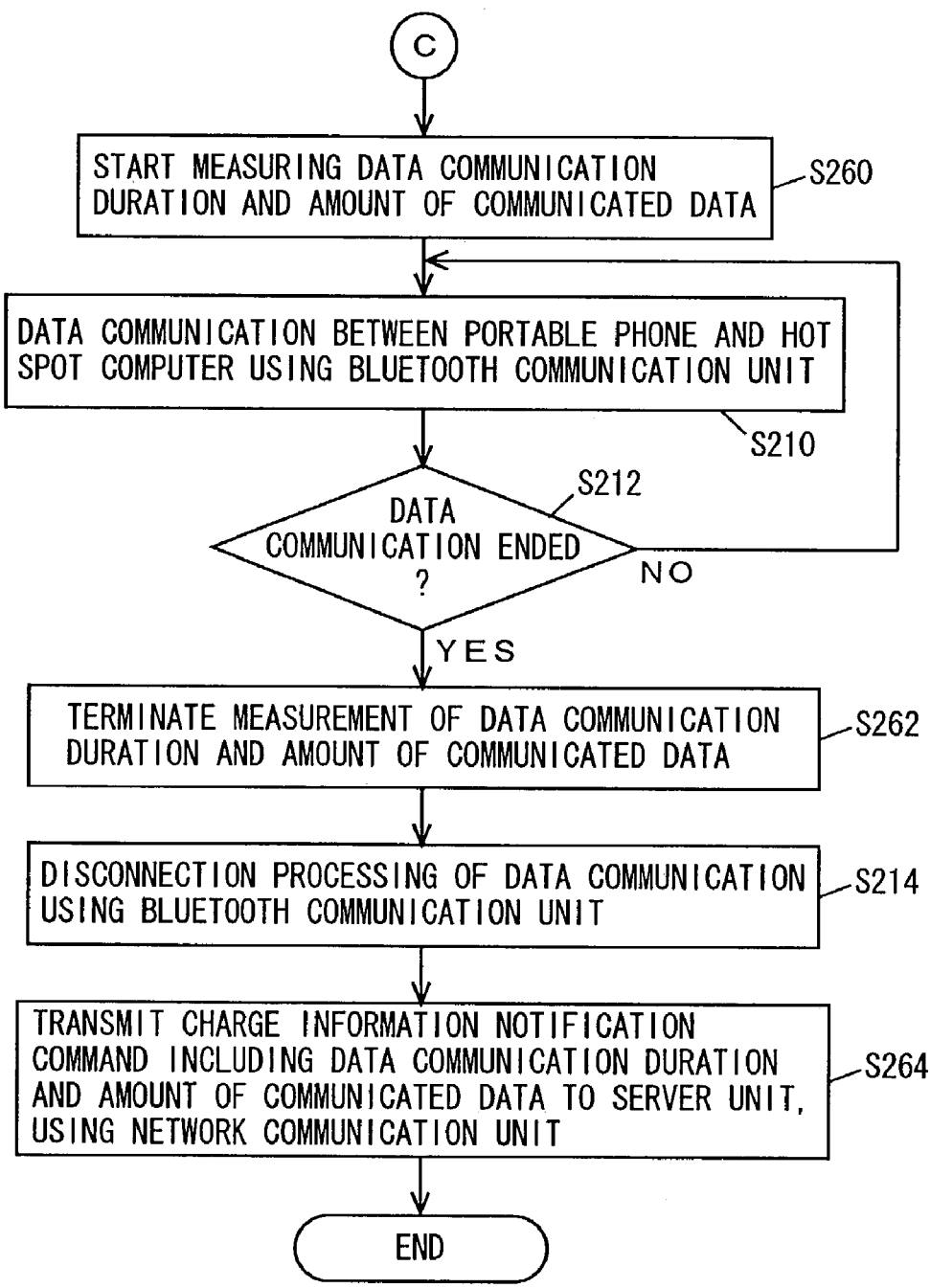

Referring to FIGS. 47A and 47B, a program executed in hot spot computer 2000 according to the present embodiment has the following control configuration. It is to be noted that, in the flowcharts shown in FIGS. 47A and 47B, the same step numbers are provided to the same process steps as in the flowchart shown in aforementioned FIG. 11. The processing therein is also the same. Therefore, detailed description therefor will not be repeated.

At S260, CPU 220 of hot spot computer 2000 starts measuring the data communication duration and the amount of communicated data. At S262, CPU 220 terminates measurement of the data communication duration and the amount of communicated data.

At S264, CPU 220 uses network communication unit 228 to transmit the charge information notification command (FIG. 44) including the data communication duration and the amount of communicated data to server unit 1000.

Referring to FIG. 48, a program executed in the hot spot computer according to the present embodiment has the following control configuration, with regard to the charge information request processing.

At S270, CPU 220 of hot spot computer 2000 determines whether or not the request for the charge information is detected. The determination is carried out based on the information input through keyboard 110 or mouse 112 of hot spot computer 2000. When the request of he charge information is detected (YES at S270), the processing will proceed to S272. Otherwise (NO at S270), the processing will return to S270, and waits until the request for the charge information is input through keyboard 110 or mouse 112 of hot spot computer 2000.

At S272, CPU 220 transmits the charge information request command (FIG. 45) to server unit 1000 from network communication unit 228. At S274, CPU 220 determines whether or not the total charge information notification command (FIG. 46) is received. When the total charge information notification command (FIG. 46) is received (YES at S274), the processing will proceed to S276. Otherwise (NO at S274), the processing will return to S274, and waits until the total charge information notification command (FIG. 46) is received from server unit 1000.

At S276, CPU 220 displays the received charge information on monitor 104.

Referring to FIG. 49, a program executed in server unit 1000 according to the present embodiment has the following control configuration. It is to be noted that, in the flowchart shown in FIG. 49, the same step numbers are provided to the same process steps as in the flowchart shown in aforementioned FIG. 43. The processing therein is also the same. Therefore, detailed description therefor will not be repeated.

At S180, CPU 120 of server unit 1000 determines whether or not the charge information notification command (FIG. 44) is received from hot spot computer 2000. When the charge information notification command (FIG. 44) is received from hot spot computer 2000 (YES at S180), the processing will proceed to S172. Otherwise (NO at S180), the processing will move to S182.

At S182, CPU 120 determines whether or not the charge information request command (FIG. 45) is received from hot spot computer 2000. When the charge information request command (FIG. 45) is received from hot spot computer 2000 (YES at S282), the processing will proceed to S184. Otherwise (NO at S182), the processing will return to S180.

At S184, CPU 120 uses network communication unit 128 to transmit the charge information in the charge administration table (FIG. 37) by the hot spot, stored in fixed disk 124, to hot spot computer 2000. In the above description, though the charge information in the charge administration table by the hot spot computer is transmitted to hot spot computer 2000, the present invention is not limited to such an example, and the charge information in the charge administration table by the portable phone may be transmitted.

An operation of the radio communication system according to the present embodiment based on the above-described configuration and the flowchart will be described.

In hot spot computer 2000, when the data communication between portable phone 300 and hot spot computer 2000 is started, measurement of the data communication duration and the amount of communicated data is initiated (S260). When the data communication is terminated (YES at S212), measurement of the data communication duration and the amount of communicated data is terminated (S262). Hot spot computer 2000 uses network communication unit 228 to transmit the charge information notification command (FIG. 44) including the data communication duration and the amount of communicated data to server unit 1000 (S264).

In server unit 1000, when the charge information notification command (FIG. 44) is received from hot spot computer 2000 (YES at S180), the charge information in the charge administration table (FIG. 36) by the portable phone, stored in fixed disk 124 is updated, and the charge information in the charge administration table (FIG. 37) by the hot spot computer is updated (S172, S174).

In hot spot computer 2000, when the request for the charge information is input with keyboard 110 or mouse 112 (YES at S270), the charge information request command (FIG. 45) is transmitted from network communication unit 228 to server unit 1000 (S272).

In server unit 1000, when the charge information request command (FIG. 45) is received from hot spot computer 2000 (YES at S182), the charge information in the charge administration table (FIG. 37) by the hot spot computer, stored in the fixed disk is transmitted to hot spot computer 2000, using network communication unit 128 (S184).

In hot spot computer 2000, when the total charge information notification command (FIG. 46) is received (YES at S274), the received charge information is displayed on monitor 104.

As described above, according to the radio communication system in the present embodiment, the hot spot computer measures the communication duration and the amount of communicated data between the hot spot computer and the portable phone for transmission to the server unit. The server unit stores the charge information based on the communication duration and the amount of communicated data received from hot spot computer 2000. When the charge information is requested to the server unit, the hot spot computer can output the charge information transmitted from the server unit.

Embodiment 8

In the following, a radio communication system according to Embodiment 8 of the present invention will be described. Here, the radio communication system according to the present embodiment has a hardware configuration similar to that according to above-described Embodiment 3. In other words, server unit 1000 communicates data with hot spot computer 2000 via network 510.

Server unit 1000 includes a processing unit performing a charge processing and a processing statistic information such as the number of inquiries. The charge information notification command communicated between server unit 1000 and portable phone 300 includes the charge information and the statistic information.

Portable phone 300 notifies server unit 1000 of the hot spot ID, after obtaining the hot spot ID from hot spot computer 2000. Server unit 1000 that has received the identification information notification command extracts the telephone number of portable phone 300 included in the command, and in the processing unit, performs the charge processing or counts the number of inquiries with respect to the inquiry for each portable phone 300, for storage. In addition, server unit 1000 transmits the charge information notification command including the charge information and the statistic information to portable phone 300. Portable phone 300 extracts the charge information and the statistic information based on the received charge information notification command, and stores or displays that information. Here, when a unit for processing the charge and updating the statistic information is managed for each telephone number of portable phone 300, the charge information may be held per user of portable phone 300, and the user may pay the charge based on that charge information. Alternatively, the charge information may be held per a store where hot spot computer 2000 is installed, for example, and the store may pay the charge based on the charge information.

Thus, by providing the processing unit updating the charge processing and the statistic information in the server unit, charging in accordance with the connection status for each portable phone or for each hot spot computer can be implemented. In other words, the server unit can handle the charge processing based on the inquiry from the portable phone to the server unit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A radio communication system, comprising:
 a plurality of first communication units;
 a second communication unit; and
 a portable terminal establishing radio communication with each of said first communication units; wherein
 said first communication unit includes
 storage means for storing identification information for identifying the unit itself and authentication information corresponding to said identification information, and
 transmission means connected to said storage means, for transmitting said identification information to said portable terminal;
 said portable terminal includes
 first reception means for receiving said identification information from said first communication unit, and
 first transmission means for transmitting said identification information to said second communication unit;
 said second communication unit includes
 reception means for receiving said identification information from said portable terminal,
 first registration means for registering the identification information and the authentication information corresponding to each of said first communication units,
 search means connected to said reception means and said first registration means, for searching the registered authentication information based on the identification information received from said portable terminal, and
 transmission means connected to said search means, for transmitting searched authentication information to said portable terminal;
 said portable terminal further includes
 second reception means for receiving said searched authentication information from said second communication unit, and
 second transmission means for transmitting information requesting connection of said portable terminal with said first communication unit to said first communication unit; and
 said first communication unit further includes
 reception means for receiving information requesting connection from said portable terminal, and
 determination means connected to said reception means and said storage means, for determining whether or not connection of said portable terminal to said first communication unit is permitted based on said searched authentication information and said stored authentication information.

2. The radio communication system according to claim 1, wherein
 said portable terminal further includes storage means for storing identification data for identifying the terminal itself,
 said first transmission means includes means for transmitting said identification information to said second communication unit along with said identification data,
 said second communication unit further includes second registration means for registering identification data of portable terminal satisfying a predetermined condition, and transmission means of said second communication unit includes means for transmitting searched authentication information to said portable terminal when identification data received from said portable terminal has been registered in said second registration means.

3. The radio communication system according to claim 2, wherein
said portable termihal is a portable phone, and said identification data is a telephone number of the portable phone.

4. The radio communication system according to claim 1, wherein
said first communication unit further includes communication means for communicating with said second communication unit,
said second communication unit further includes communication means for communicating with said first communication unit, and
storage means of said first communication unit includes means for storing identification information for identifying the unit itself and authentication information corresponding to said identification information based on information transmitted from said second communication unit to said first communication unit with said communication means, when the predetermined condition is satisfied.

5. The radio communication system according to claim 1, wherein
said first communication unit further includes communication means for communicating with said second communication unit,
said second communication unit further includes communication means for communicating with said first communication unit, and
said first registration means includes means for registering identification information and authentication information corresponding to each of said first communication units based on information transmitted from said first communication unit to said second communication unit with said communication means, when a predetermined condition is satisfied.

6. The radio communication system according to claim 1, wherein
said first communication unit further includes communication means for communicating with said second communication unit,
said second communication unit further includes communication means for communicating with said first communication unit,
said portable terminal further includes storage means for storing identification data for identifying the terminal itself and authentication data,
said first transmission means includes means for transmitting said identification information to said second communication unit along with said identification data and said authentication data, and
said second communication unit further includes
determination means for determining whether or not said authentication data is valid, and
control means for controlling transmission means and communication means of said second communication unit so as to transmit any one of said identification data, said authentication data and said authentication information to said portable terminal and said first communication unit based on determination by said determination means.

7. The radio communication system according to claim 1, wherein
said portable terminal further includes
creation means for creating charge information with respect to communication between said portable terminal and said first communication unit, and
control means connected to said creation means, for controlling said first transmission means so as to transmit said charge information to said second communication unit,
said second communication unit further includes
storage means for storing charge information received from said portable terminal, and
control means for controlling said transmission means so as to transmit charge information stored in said storage means to said portable terminal in response to request information from said portable terminal, and
said portable terminal further includes output means for outputting charge information transmitted from said second communication unit in response to said request information.

8. The radio communication system according to claim 4, wherein
said first communication unit further includes
creation means for creating charge information with respect to communication between said portable terminal and said first communication unit, and
control means connected to said creation means, for controlling communication means of said first communication unit so as to transmit said charge information to said second communication unit,
said second communication unit further includes
storage means for storing charge information received from said first communication unit, and
control means for controlling communication means of said second communication unit so as to transmit charge information stored in said storage means to said first communication unit in response to request information from said first communication unit, and
said first communication unit further includes output means for outputting charge information transmitted from said second communication unit in response to said request information.

9. A first communication unit used with a radio communication system including a plurality of first communication units, a second communication unit, and a portable terminal establishing radio communication with each of said first communication units, said portable terminal receiving said identification information from said first communication unit and transmitting said identification information to said second communication unit, said second communication unit receiving said identification information from said portable terminal, searching authentication information registered corresponding to identification information received from said portable terminal, from identification information and authentication information registered corresponding to each of said first communication units, and transmitting searched authentication information to said portable terminal, said portable terminal receiving said searched authentication information from said second communication unit, and transmitting information requesting connection of said portable terminal with said first communication unit to said first communication unit; wherein
said first communication unit includes
storage means for storing identification information for identifying the unit itself and authentication information corresponding to said identification information, transmission means connected to said storage means, for transmitting said identification information to said portable terminal, reception means for receiving information requesting connection from said portable terminal, and determination means connected to said reception means and said storage means, for determining whether or not connection of said portable terminal to said first communication unit is permitted, based on said stored authentication information.

10. The communication unit according to claim 9, wherein said first communication unit further includes communication means for communicating with said second communication unit, and said storage means includes means for storing identification information for identifying the unit itself and authentication information corresponding to said identification information based on information transmitted from said second communication unit to said first communication unit with said communication means, when a predetermined condition is satisfied.

11. The communication unit according to claim 9, wherein said second communication unit stores charge information received from said first communication unit, and transmits said stored charge information to said first communication unit in response to request information from said first communication unit, and said first communication unit further includes communication means for communicating with said second communication unit, creation means for creating charge information with respect to communication between said portable terminal and said first communication unit, control means connected to said creation means, for controlling said communication means so as to transmit said charge information to said second communication unit, and output means for outputting charge information transmitted from said second communication unit in response to said request information.

12. A second communication unit used with a radio communication system including a plurality of first communication units, the second communication unit, and a portable terminal establishing radio communication with each of said first communication units, said first communication unit storing identification information for identifying the unit itself and authentication information corresponding to said identification information, and transmitting said identification information to said portable terminal, said portable terminal transmitting said identification information received from said first communication unit to said second communication unit, receiving searched authentication information from said second communication unit, and transmitting information requesting connection of said portable terminal with said first communication unit to said first communication unit, and said first communication unit receiving information requesting connection from said portable terminal to determine whether or not connection of said portable terminal to said first communication unit is permitted based on said searched authentication information and said stored authentication information; wherein said second communication unit includes reception means for receiving said identification information from said portable terminal, first registration means for registering the identification information and the authentication information corresponding to each of said first communication units, search means connected to said reception means and said first registration means, for searching the registered authentication information based on the identification information received from said portable terminal, and transmission means connected to said search means, for transmitting searched authentication information to said portable terminal.

13. The communication unit according to claim 12, wherein said portable terminal stores identification data for identifying the terminal itself, said first transmission means transmits said identification information to said second communication unit along with said identification data, said second communication unit further includes second registration means for registering identification data of portable terminal satisfying a predetermined condition, and said transmission means includes means for transmitting searched authentication information to said portable terminal when identification data received from said portable terminal has been registered in said second registration means.

14. The communication unit according to claim 12, wherein said first communication unit communicates with said second communication unit, said second communication unit further includes communication means for communicating with said first communication unit, and said first registration means includes means for registering identification information and authentication information corresponding to each of said first communication units based on information transmitted from said first communication unit to said second communication unit with said communication means, when a predetermined condition is satisfied.

15. The communication unit according to claim 12, wherein said first communication unit communicates with said second communication unit, said portable terminal stores identification data for identifying the terminal itself and authentication data, and transmits said identification information to said second communication unit along with said identification data and said authentication data, and said second communication unit further includes communication means for communicating with said first communication unit, determination means for determining whether or not said authentication data is valid, and control means for controlling said transmission means and communication means so as to transmit any one of said identification data, said authentication data and said authentication information to said portable terminal and said first communication unit based on determination by said determination means.

16. The communication unit according to claim 12, wherein said portable terminal creates charge information with respect to communication with said first communication unit, transmits said charge information to said second communication unit, and outputs the charge information transmitted from said second communication unit in response to request information, and said second communication unit further includes
storage means for storing the charge information received from said portable terminal, and
control means for controlling said transmission means so as to transmit the charge information stored in said storage means to said portable terminal in response to request information from said portable terminal.

17. The communication unit according to claim 14, wherein
said first communication unit creates charge information with respect to communication between said portable terminal and said first communication unit, transmits said charge information to said second communication unit, and outputs the charge information transmitted from said second communication unit in response to said request information, and
said second communication unit further includes
storage means for storing the charge information received from said first communication unit, and
control means for controlling said communication means so as to transmit the charge information stored in said storage means to said first communication unit in response to request information from said first communication unit.

18. A portable terminal used with a radio communication system including a plurality of first communication units, a second communication unit, and the portable terminal establishing radio communication with each of said first communication units, said first communication unit storing identification information for identifying the unit itself and authentication information corresponding to said identification information, and transmitting said identification information to said portable terminal, said second communication unit receiving said identification information from said portable terminal, registering identification information and authentication information corresponding to each of said first communication units, searching registered authentication information based on the identification information received from said portable terminal, and transmitting searched authentication information to said portable terminal, said first communication unit receiving information requesting connection from said portable terminal, and determining whether or not connection of said portable terminal to said first communication unit is permitted based on said stored authentication information; wherein
said portable terminal includes
first reception means for receiving said identification information from said first communication unit,
first transmission means for transmitting said identification information to said second communication unit,
second reception means for receiving said searched authentication information from said second communication unit, and
second transmission means for transmitting information requesting connection of said portable terminal with said first communication unit to said first communication unit.

19. The portable terminal according to claim 18, wherein
said second communication unit registers identification data of portable terminal satisfying a predetermined condition, and transmits searched authentication information to said portable terminal when identification data received from said portable terminal has been registered in said second registration means,
said portable terminal further includes storage means for storing identification data for identifying the terminal itself, and
said first transmission means includes means for transmitting said identification information to said second communication unit along with said identification data.

20. The portable terminal according to claim 19, wherein
said portable terminal is a portable phone, and said identification data is a telephone number of the portable phone.

21. The portable terminal according to claim 18, wherein
said first communication unit communicates with said second communication unit,
said second communication unit determines whether or not authentication data is valid, and transmits any one of said authentication data and said authentication information to said portable terminal and said first communication unit based on said determination,
said portable terminal further includes storage means for storing identification data for identifying the terminal itself and authentication data, and
said first transmission means includes means for transmitting said identification information to said second communication unit along with said identification data and said authentication data.

22. The portable terminal according to claim 18, wherein
said second communication unit stores charge information received from said portable terminal, and transmits said stored charge information to said portable terminal in response to request information from said portable terminal, and
said portable terminal further includes creation means for creating charge information with respect to communication between said portable terminal and said first communication unit,
control means connected to said creation means, for controlling said first transmission means so as to transmit said charge information to said second communication unit, and
output means for outputting the charge information transmitted from said second communication unit in response to said request information.

23. In a radio communication system comprising a plurality of first communication units, a second communication unit and a portable terminal adapted to communicate with each of the first communication units and the second communication unit, a method comprising the steps of:
storing in each one of the first communication units first communication unit identification information in association with respective first communication unit authentication information;
transmitting the first communication unit identification information, but not the first communication unit authentication information, from a given one of the first communication units to the portable terminal;
receiving at the portable terminal the first communication unit identification information from the given one of the first communication units;
transmitting the first communication unit identification information from the portable terminal to the second communication unit;
receiving at the second communication unit the first communication unit identification information from the portable terminal;
retrieving at the second communication unit previously stored authentication information corresponding to the first communication unit identification information received from the portable unit;
transmitting the retrieved authentication information from the second communication device to the portable unit;

transmitting from the portable unit to the given one of the first communication units the authentication information received from the second communication unit and a request for connection to the given one of the first communication units; and determining at the given one of the first communication units whether connection to the portable unit is permitted based on the authentication information received from the portable unit.

* * * * *